US007885840B2

(12) United States Patent
Sadiq et al.

(10) Patent No.: US 7,885,840 B2
(45) Date of Patent: Feb. 8, 2011

(54) SYSTEM AND METHOD OF FLEXIBLE WORKFLOW MANAGEMENT

(75) Inventors: Shazia Sadiq, Westlake (AU); Wasim Sadiq, Westlake (AU); Maria E. Orlowska, Brookfield (AU)

(73) Assignee: SAP Aktiengesellschaft, Walldorf (DE)

( * ) Notice: Subject to any disclaimer, the term of this patent is extended or adjusted under 35 U.S.C. 154(b) by 1612 days.

(21) Appl. No.: 10/671,876

(22) Filed: Sep. 29, 2003

(65) Prior Publication Data

US 2004/0133457 A1 Jul. 8, 2004

Related U.S. Application Data

(60) Provisional application No. 60/438,297, filed on Jan. 7, 2003.

(51) Int. Cl.
   *G06F 17/00* (2006.01)
(52) U.S. Cl. .............................. 705/7; 705/8
(58) Field of Classification Search ............. 705/7, 705/8
   See application file for complete search history.

(56) References Cited

U.S. PATENT DOCUMENTS

| 5,734,837 | A | * | 3/1998 | Flores et al. .............. 705/7 |
| 5,937,388 | A | * | 8/1999 | Davis et al. .............. 705/8 |
| 5,999,911 | A | * | 12/1999 | Berg et al. .............. 705/9 |
| 6,041,306 | A | * | 3/2000 | Du et al. .............. 705/8 |
| 6,081,268 | A | * | 6/2000 | Heydon et al. .............. 345/418 |
| 7,184,967 | B1 | * | 2/2007 | Mital et al. .............. 705/8 |
| 2003/0204429 | A1 | * | 10/2003 | Botscheck et al. .............. 705/8 |
| 2003/0225607 | A1 | * | 12/2003 | Kopunovic et al. .............. 705/9 |

OTHER PUBLICATIONS

Peter Mangan & Shazia Sadiq, "On Building Workflow Models for Flexible Processes," The Thirteenth Australasian Database Conference ADC2002 (Jan. 28, 2002).*
Peter J. Mangan & Shazia Sadiq, "A Contraint Specification Approach to Building Flexible Workflows," J. Res. & Practice in IT, vol. 35, No. 1 (Feb. 2003).*
Shazia Sadiq, et al., "Pockets of Flexibility in Workflow Specification," Proceedings of the 20th International Conference on Conceptual Modeling, Lecture Notes In Computer Science 2224, pp. 513-526 (H.S. Kunii, et al., eds. 2001).*

(Continued)

*Primary Examiner*—Beth V Boswell
*Assistant Examiner*—Justin M Pats
(74) *Attorney, Agent, or Firm*—Fish & Richardson P.C.

(57) ABSTRACT

A flexible workflow is described that includes a pocket of flexibility. The pocket of flexibility may include workflow fragments that may be joined together, subject to pre-defined constraints. In implementing the flexible workflow, a user may encounter the pocket of flexibility, and select from the fragments to construct a workflow that is consistent with the user's current needs. The fragments may be incrementally presented to the user on a user interface, such that only those fragments determined to be combinable in a valid way may be selected by the user. In this way, a user who may have little experience with workflow languages or terminology may be able to use the flexible workflow, and be confident that the result is valid. Thus, difficulties in dealing with change in workflow systems may be mitigated, and this mitigation may be achieved without compromising the simplicity and generic nature of a workflow language.

20 Claims, 30 Drawing Sheets

OTHER PUBLICATIONS

Jonathan Lee, "A High-Level Petri Nets-Based Approach to Verifying Task Structures," IEEE Transactions on Knowledge and Data Engineering, vol. 14, No. 2 (Mar./Apr. 2002).*

Ribeiro et al., Security Policy Consistency, IST/INESC, Lisbon, Portugal, Jun. 30, 2000, p. 1-13.*

Vijayan and Tsay, Floorplanning by Topological Constraint Reduction, IBM Research Division, IEEE 1990, p. 106-109.*

Bing Liu and Joxan Jaffar, "Using Constraints to Model Disjunctions in Rule-Based Reasoning," Proceedings of the Thirteenth National Conference on Artificial Intelligence (AAAI-96), Aug. 4-8, 1996, Portland, Oregon, USA, pp. 1248-1255 (online reprint p. 1-8).*

Sadiq, Shazia W. et al., "Pockets of Flexibility in Workflow Specification," 20th International Conference on Conceptual Modelling, ER'2001, Yokohama, Japan, Nov. 27, 2001, pp. 513-526.

* cited by examiner

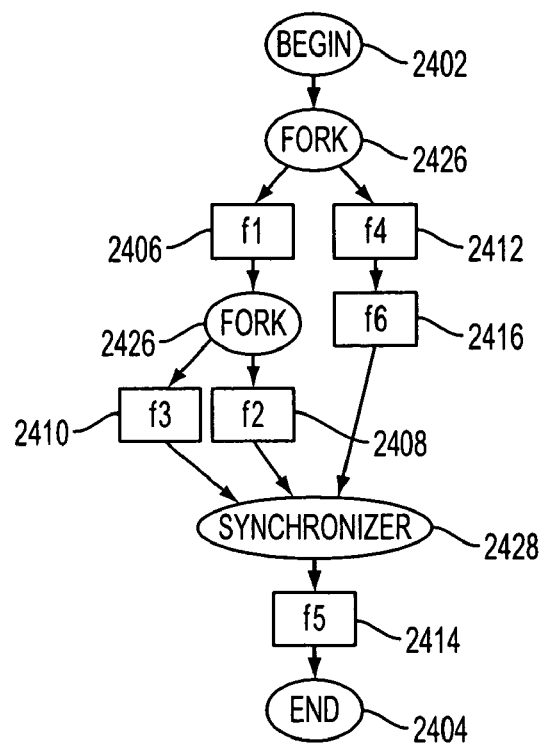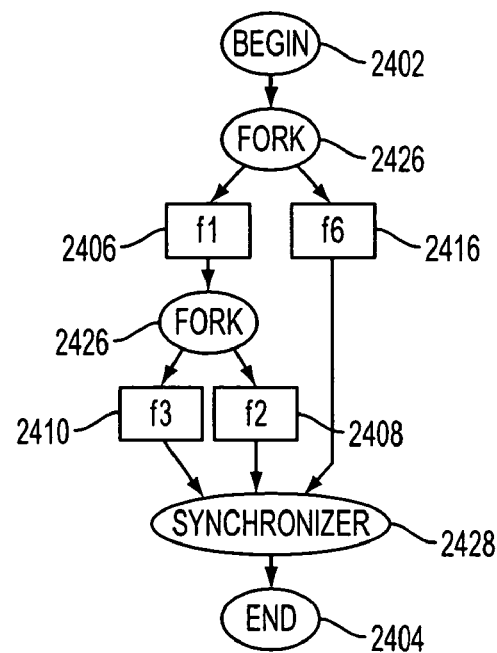
FIG. 24J
FIG. 24K

SYSTEM AND METHOD OF FLEXIBLE WORKFLOW MANAGEMENT

CROSS-REFERENCE TO RELATED APPLICATIONS

This application claims priority to U.S. Application Ser. No. 60/438,297, filed on Jan. 7, 2003, and titled FLEXIBLE WORKFLOW MANAGEMENT.

TECHNICAL FIELD

This description relates to workflow systems.

BACKGROUND

Conventional workflow systems exist which allow enterprises to formalize the processes by which the enterprises achieve their business objectives. Such workflow systems may provide step-by-step descriptions of tasks which must or should be performed as part of the workflow, so that individuals or groups within the enterprise can be assigned individual (or groups of) tasks. The tasks may be dependent upon one another; for example, a task may only be begun upon completion of a prior task(s), or tasks may be included in interative task loops. Additionally, the tasks may have more complex dependencies, requiring application of extensive logic rules to ensure proper completion of the workflow.

Examples of such conventional workflows can be found explicitly or implicitly in almost any enterprise. For example, a manufacturing plant may have a workflow for producing a particular type of good. As another example, an organization selling goods may have a workflow for obtaining the goods, inputting orders and/or payments for the goods, selecting a shipper for shipping the goods, and updating an inventory record based on the sale.

SUMMARY

According to one general aspect, a task set is specified including workflow tasks, and a constraint set is specified including constraints that specify how the tasks within the task set may be implemented with respect to one another, to thereby define valid subsets of the task set, wherein the constraint set ensures that each task may be implemented in at least one valid subset. A workflow is initiated that requires at least one of the tasks, a subset of the tasks is assembled, the subset matching one of the valid subsets, and the subset is implemented within the workflow.

Implementations may include one or more of the following features. For example, in specifying the constraint set, a minimized specification of the constraint set may be determined. In this case, redundant constraints may be removed from the constraint set. Also, elements of the constraint specification may be reduced based on transitivities associated with the constraints, or a conflict between the constraints may be removed.

In the latter case, in removing the conflict, the tasks and constraints may be translated into a graph, and the graph may be traversed to determine a conflict-free constraint specification. In translating the tasks and constraints, the tasks and constraints may be translated into a directed, acyclic graph. Also in removing the conflict, truth tables may be formed, each truth table associated with one of the constraints, and the conflict may be removed based on the truth tables.

In specifying the constraint set, user input may be accepted for removing a conflict between two constraints within the constraint set, or a structural constraint may be specified that imposes a restriction on how tasks are included within the valid subsets, or a containment constraint may be specified that specifies conditions under which tasks are included within the valid subsets.

In assembling the subset of the tasks, the tasks may be output for display to a user, and input identifying a selected task may be accepted from the user for inclusion in the subset. In this case, a reduced task set may be determined, based on the selected task and the constraints, the reduced task set may be output for display to the user, and input identifying a second selected task may be accepted from the user for inclusion in the subset. Also in assembling the subset of the tasks, the subset may be validated, based on the constraints, to ensure that the subset matches one of the valid subsets.

According to another general aspect, a system includes a process modeling tool operable to create a workflow process model, the process model including a configurable task set that includes tasks and constraints that define relationships between the tasks, a constraints validation engine operable to validate the tasks and the constraints such that each of the tasks are includable in at least one task subset without violating any of the constraints, and a workflow engine operable to copy the process model to thereby create an open instance, and further operable to activate the configurable task set during execution of the open instance, and to thereby compile and execute an instance template including a selected task subset of the tasks.

Implementations may include one or more of the following features. For example, the constraints validation engine may be further operable to validate the instance template for conformance with the constraints. The workflow engine may be operable to activate the configurable task set by outputting the tasks for display to a user, and is further operable to accept the selected task subset from the user. In this case, the workflow engine may be operable to progressively accept the selected task subset from the user by outputting a revised task set for display to the user after accepting a selected task by the user, and the constraints validation engine may be operable to validate the revised task set based on the constraints.

The constraints may include a structural constraint that imposes a restriction on how tasks are included within the instance template, or a containment constraint that specifies conditions under which tasks are included within the instance template.

The constraints validation engine may be operable to provide a minimized specification of the constraints. The constraints validation engine may provide the minimized specification based on a redundancy and a transitivity associated with the constraints. The constraints validation engine also may provide the minimized specification by removing conflicts between the constraints, based on user input.

The process model may include a pre-configured workflow portion having pre-defined tasks and task relationships, in addition to the configurable task set. A worklist manager may be included that is operable to communicate with the workflow engine and thereby disseminate task information related to the instance template to workitem performers.

According to another general aspect, an apparatus includes a storage medium having instructions stored thereon. The instructions include a first code segment for initiating execution of a workflow, a second code segment for encountering a build activity within the workflow that represents a sub-goal of the workflow, the build activity including both tasks and constraints that specify how subsets of the tasks may be compiled to form a control flow for achieving the sub-goal, a third code segment for outputting the tasks for viewing by a user on a display device, a fourth code segment for accepting a selected task that is selected from the tasks by the user, a fifth code segment for determining a reduced set of the tasks based on the selected task and the constraints, a sixth code segment for outputting the reduced set for viewing by the user, a seventh code segment for accepting a second selected task that is selected by the user from the reduced set, an eighth code segment for including the selected task and the second selected task within a sub-workflow, and a ninth code segment for replacing the build activity with the sub-workflow for implementation within the workflow.

Implementations may include one or more of the following features. For example, the second code segment may include a tenth code segment for ensuring that the constraints permit each task to be included within at least one control flow.

The second code segment may include a tenth code segment for providing a minimized specification of the constraints by resolving conflicts between the constraints. In this case, the tenth code segment may accept user input to resolve the conflicts.

The details of one or more implementations are set forth in the accompanying drawings and the description below. Other features will be apparent from the description and drawings, and from the claims.

DESCRIPTION OF DRAWINGS

FIGS. 24A-24K are block diagrams of examples of valid templates composed from a given sets of fragments and constraints.

DETAILED DESCRIPTION

Workflow systems related to certain processes may benefit from an increased level of flexibility of design and/or implementation. Examples of processes that may benefit from increased flexibility include processes that undergo frequent change, cannot be completely pre-defined, or simply have a large number of possible instantiations. Increased flexibility for a workflow related to one of these processes, however, should not be obtained at a cost of factors that contribute to the usefulness of the workflow system in the first place, such as, for example, its ability to be easily created, used, enforced, and/or reproduced.

One example of workflows that may benefit from increased flexibility includes healthcare workflows. In such workflows, for example, patient admission procedures are often predictable and repetitive, while, in contrast, in-patient treatments often are prescribed uniquely for each case (but nonetheless have to be coordinated and controlled). Another example includes higher education, where students with diverse learning needs and styles are working towards a common goal (degree). Study paths taken by each student need to remain flexible to a large extent, while, at the same time, study guidelines and course level constraints are necessary to ensure a certain quality of learning.

Another example may include a workflow system related to content development and management of sites on the World Wide Web (WWW), such as sites for conducting commerce. Particularly in large projects, every development may suggest a need for an overall plan to provide objectives, approvals, and strategies related to the site(s), as well as a flexible means of coordinating the combined efforts of workers including, for example, theme designers, graphic experts, programmers, and project planners. As a final example, Customer Relationship Management (CRM) systems also may benefit from flexible techniques for conducting call center activities according to available resources and data, by, for example, integrating CRM systems with core organizational workflow processes and underlying applications.

Figure 1:
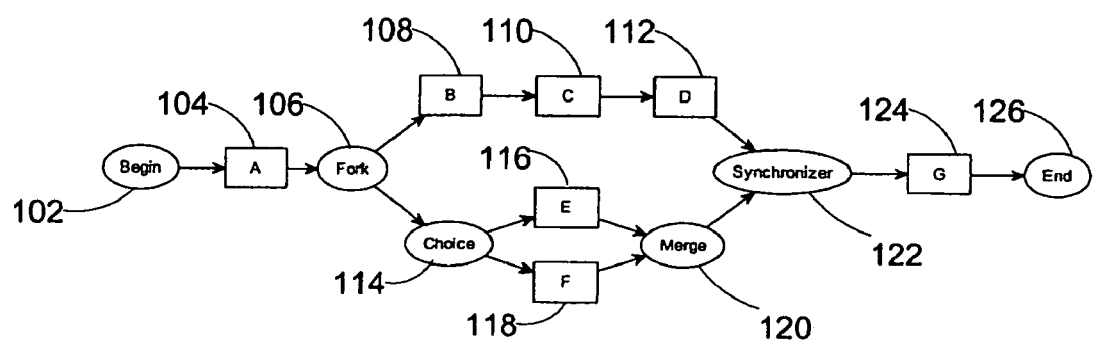
FIG. 1 is a block diagram of a generic workflow.

FIG. 1 is a block diagram of a generic workflow 100. In FIG. 1, the workflow 100 begins with a begin command 102, which initiates a task A 104. The task A 104 leads to a fork 106, which initiates two parallel sub-flows of the workflow 100. Specifically, the fork 106 first leads to a task B 108, a task C 110, and a task D 112. The fork 106 also leads to a choice task 114, which leads to one (and only one) of a task E 116 and a task F 118. After one of the task E 116 or the task F 118 is selected, a merge task 120 leads to a synchronizer task 122. The synchronizer task 122 re-joins the two sub-flows initiated by the fork 106, and leads to a task G 124, which leads to an end 126 of the workflow 100.

In FIG. 1, it should be understood that the tasks of the workflow 100 are chosen for illustrative purposes, and that many other types of workflow tasks and events also may be included therein. Moreover, inasmuch as various languages exist for describing workflows, other names for such tasks and events also may be used. For example, the fork 106 and the synchronizer task 122 may alternately be referred to as an "AND-split" and an "AND-join" task, respectively. Similarly, the choice task 114 and the merge task 120 may alternately be referred to as an "OR-split" and an "OR-join" task, respectively. Thus, in the following description, workflows and workflow language terms are used that are simple and generic to many or all workflow systems, so as to demonstrate the wide applicability of the various techniques disclosed herein.

In the workflow 100, the various tasks together represent a "process model," where the process model represents all particular implementations, or instances, that might result from a user running the workflow 100. In the workflow 100, for example, because of the choice task 114 and the corresponding merge task 120, there are two separate instances, or instance types, that a user may actually implement during workflow execution.

Specifically, the first instance includes all tasks except the task F 118, and the second instance includes all tasks except the task E 116. In other words, in any given execution of the process model of the workflow 100, only one of task E 116 or task F 118 will be executed. For example, in a healthcare setting, it may be that task E 116 and task F 118 represent two treatment options that are exclusive of one another, such as when two medications are contra-indicated. In this case, for any one patient (i.e., instance), only one of the two treatments (tasks) will be implemented.

Thus, a number of instance types in a given workflow process model has a direct correlation with, for example, a number of choice/merge constructs found within the process model. Although only two instance types are associated with the process model of the workflow 100 of FIG. 1, it may be the case that a large number of paths are present within a choice-merge construct. Moreover, each of these paths may potentially represent a complex sub-process. Further, there may be several such constructs within the process model (which also may include nesting).

From the above discussion, it should be understood that one technique for quantifying a flexibility of a workflow is to determine a number of instance types that may be generated from the process model of the workflow. Another technique for quantifying workflow flexibility, as referred to above, is to consider the extent to which an instance of the workflow is predictable. Predictability may be influenced by a number of factors. For example, again in a healthcare setting, a patient may present with any number of injuries, illnesses, or conditions, some of which may not be anticipated by the healthcare provider in charge of defining the associated workflow process model. As another example, treatments associated with a particular illness may change over time, as new research and new medications become available. Again, such changes may be difficult or impossible for a designer of a process model to predict and/or incorporate into a given workflow.

Figure 2:
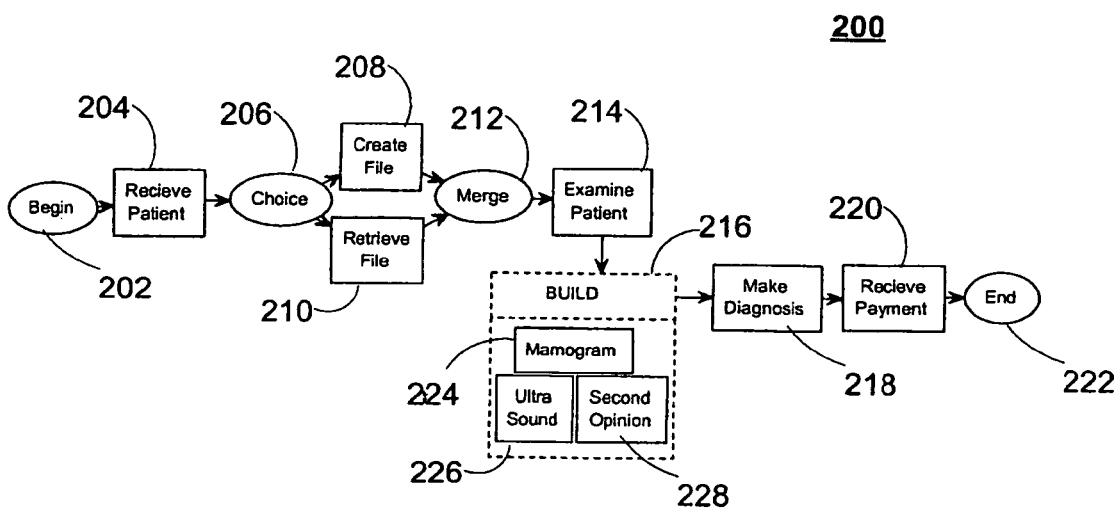
FIG. 2 is a block diagram of a process model of a workflow for treating a patient in a hospital setting.

FIG. 2 is a block diagram of a workflow 200 for treating a patient in a hospital setting. In FIG. 2, the workflow 200 begins with a begin command 202, whereupon the patient is received into the hospital in a task 204. A choice task 206 takes into account the possibility that the patient may either be a new patient, in which case a patient file is created in a task 208, or a returning patient, in which case a patient file is retrieved in a task 210. After one of the two file tasks is completed, a merge task 212 consolidates the workflow and allows for a task 214 in which the patient is examined.

Subsequently, a build activity 216, discussed in more detail below, provides multiple treatment options, each of which are constructed and enacted in a manner that is consistent with the overall workflow 200. Based on the treatment options enacted as part of the build activity 216, a diagnosis is made in a task 218, whereupon the hospital receives/processes a payment from the patient in a task 220, which leads to an end 222 of the workflow 200.

To understand the role of the build activity 216, it should be understood that many workflow enactment systems differentiate between two aspects of workflow specification referred to above, i.e., the workflow process model and the workflow execution (control) data. Specifically, the process model defines the process logic that provides the schema for particular instances of that process model. Workflow execution data, on the other hand, includes actual work items, where each work item relates to a particular execution of a task or activity. The work item thus stores all execution parameters of a particular activity, such as client assigned, relevant data, and temporal values.

In short, the process model applies to "all" instances, while the execution data applies to "one" instance. By using the build activity 216, a layer is introduced between the process model (definition) layer and the work-item (execution) data, where this layer may apply to "some" instances. As a result, for a particular instance (e.g., for a particular patient in workflow 200), an open (not fully specified) instance of the process model exists, so that the process model provides only a partial definition of the workflow itself.

Thus, a specification of a partial workflow implies a flexible workflow, which includes, in the example of FIG. 2, several identifiable parts. For example, the workflow 200 is said to include a defined core process containing (1) identifiable (pre-defined) workflow activities and control dependencies, (2) one or more "pockets of flexibility," which in turn consist of a special workflow activity illustrated as the build activity 216. The build activity 216 includes workflow "fragments," each of which represents a pre-defined activity or sub-process, and is associated with rules (referred to sometimes as "build constraints" or "constraints") for ensuring a validity of a proposed composition of the workflow fragments. Specifically, in FIG. 2, the build activity 216 includes a fragment 224 for performing a mammogram test, a fragment 226 for performing an ultrasound test, and a fragment 228 for obtaining a second opinion.

In the build activity 216, then, a control flow between the fragments 224, 226, and 228 is not completely defined in the core, or fixed, portion of the open instance (process). That is, many different possibilities for combining the fragments exist; for example, some, all, or none of the fragments may be used, and enactment of one fragment may be exclusive of, or dependent on, enactment of one or more other fragments. Rules, i.e., build constraints, exist for combining the fragments 224, 226, and/or 228, and may be implemented to ensure that selected ones of the fragments 224, 226, and 228 are combined in a valid manner.

Figure 3:
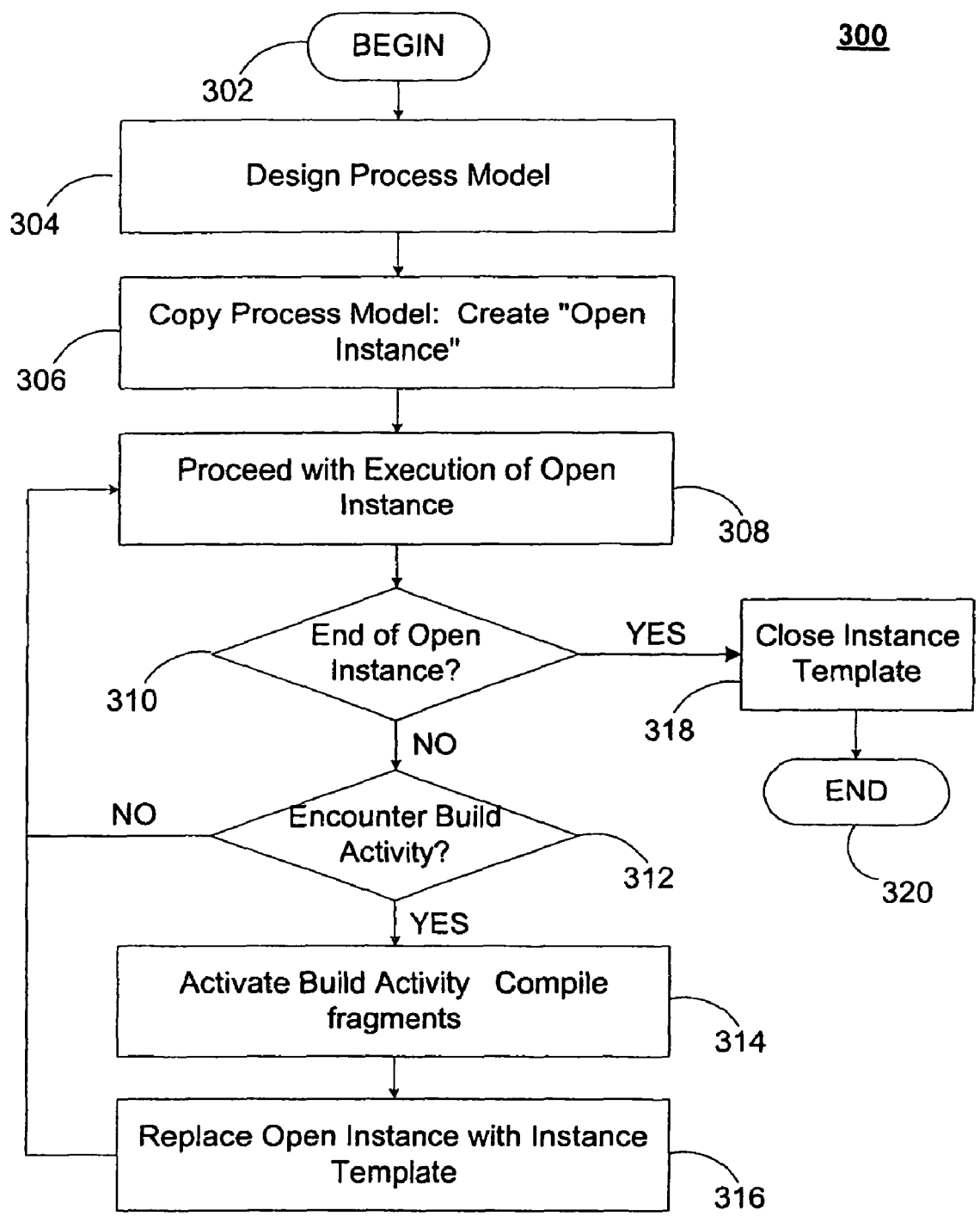
FIG. 3 is a flowchart illustrating an implementation of a flexible workflow system.

FIG. 3 is a flowchart 300 illustrating an implementation of a flexible workflow system. In FIG. 3, the implementation begins (302) with a design of a process model (304). As explained above, the process model may be applied to all potential instances that the workflow system may encounter, and may include a core (fixed) portion, as well as flexible build activities. For example, in FIG. 2, a relevant process model includes all of the tasks shown in the workflow 200, including the various decision/flow tasks such as the choice task 206 and the build activity 216. However, a given process model may not require a core or fixed portion, and may be composed entirely of one or more pockets of flexibility (e.g., build activities).

For a particular instance (e.g., for a particular patient in the example of FIG. 2), the process model is copied for enactment (execution) by a workflow engine, and this copy of the process model acts as an "open instance" of the process model (306), as referred to above. The workflow then proceeds with execution of the open instance (308), e.g., by implementing a task such as the task 204 for receiving the patient.

If the open instance does not end after implementing a given task (310), and a build activity is encountered (312), then the build activity (e.g., the build activity 216) is activated, and its constituent workflow fragments (fragments 224, 226, and 228) are compiled in a desired manner (314). Techniques for compiling the fragments are discussed in more detail below, but it should be understood that compilation may occur subject to various build constraints for ensuring that the fragments are combined in an acceptable, valid manner.

The open instance is replaced with an instance template (316), where the instance template (also referred to simply as "template") includes a compiled, i.e., concretized, version of the build activity, as made for a particular instance. This process repeats (308) until an end of the open instance is reached (310), whereupon the instance template is closed (318), and the process ends (320).

As can be seen from the flowchart of FIG. 3, as a particular instance proceeds with execution, build activities provide the ability to customize the open instance for a particular instance. This results in the instance templates, which have a schema-instance relationship with the underlying execution of the work items (tasks). Thus, the instance template may be thought of as a process model for a particular instance.

Execution of the instance template takes place with full enforcement of all coordination and temporal constraints, as in a typical workflow. However, it should be understood from FIG. 3 that the building of the instance templates, or "template building," may be a progressive process. That is, the open instance may contain multiple build activities, which will be concretized through the associated build activities as they are encountered. As such, in the example of FIG. 3, the template remains open until the last build activity has completed.

Figure 4A:
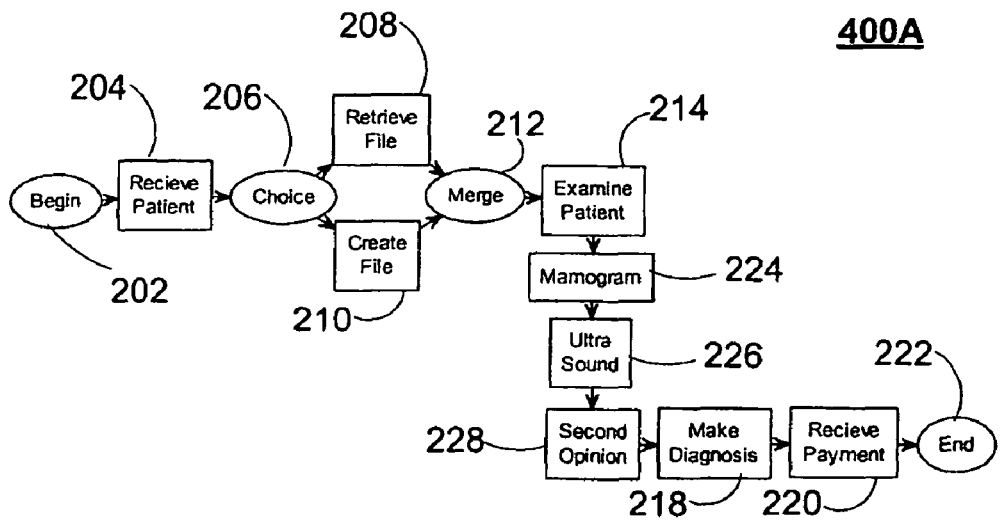
FIGS. 4A and 4B are examples of instance templates formed from an open instance of the process model of FIG. 2.
Figure 4B:
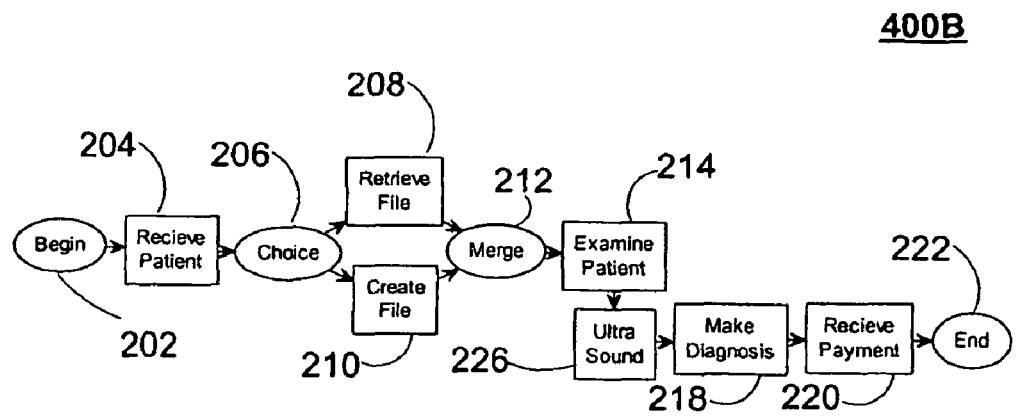

FIGS. 4A and 4B are block diagrams of examples of instance templates 400A and 400B, respectively, which are formed according to the flowchart 300 of FIG. 3. Specifically, FIGS. 4A and 4B are examples of instance templates formed from an open instance, which in turn was copied from the process model of FIG. 2.

In FIG. 4A, and in accordance with FIGS. 2 and 3, execution of the open instance proceeds through tasks 202-214 before the build activity 216 is encountered. Upon being activated, the fragments 224, 226, and 228 are all selected from the build activity 216, and are implemented in a serial fashion. Thereafter, the remaining tasks 218-222 of the open instance are executed, and the instance template 400A of FIG. 4A is complete. In FIG. 4B, when the build activity 216 is encountered, only the fragment 226, representing the task of performing an ultrasound test, is included in the instance template 400B.

Various techniques may be used for determining whether and how the fragments 224, 226, and 228 should be included in a given instance template. For example, the determination may be fully automated, in which case the build activity 216 may automatically build the instance template from the given set of workflow fragments, based on the instance data and build constraints. The determination may be only partially automated, in which case the build activity 216 may invoke a separate application program that allows a workflow client or user to build the instance template from the given set of workflow fragments, within a given set of build constraints. As a final example, the determination may be made manually, in which case the build activity 216 may allow a workflow client to define new fragments, and then build the instance template from the new (as well as existing) fragments.

To the extent that a workflow client is involved in either the partially-automated or manual technique, an interface may be advantageous for facilitating input from the workflow client. Such an interface may benefit from allowing the client to activate and implement the build activity 216 in an easy and intuitive manner, without requiring extensive knowledge of workflow languages, process models, or other structures specialized to workflow systems. Such easy and intuitive interfaces also may be advantageous for cases where the client is a specialist in the relevant field (e.g., healthcare or education), rather than a workflow specialist.

Figure 5:
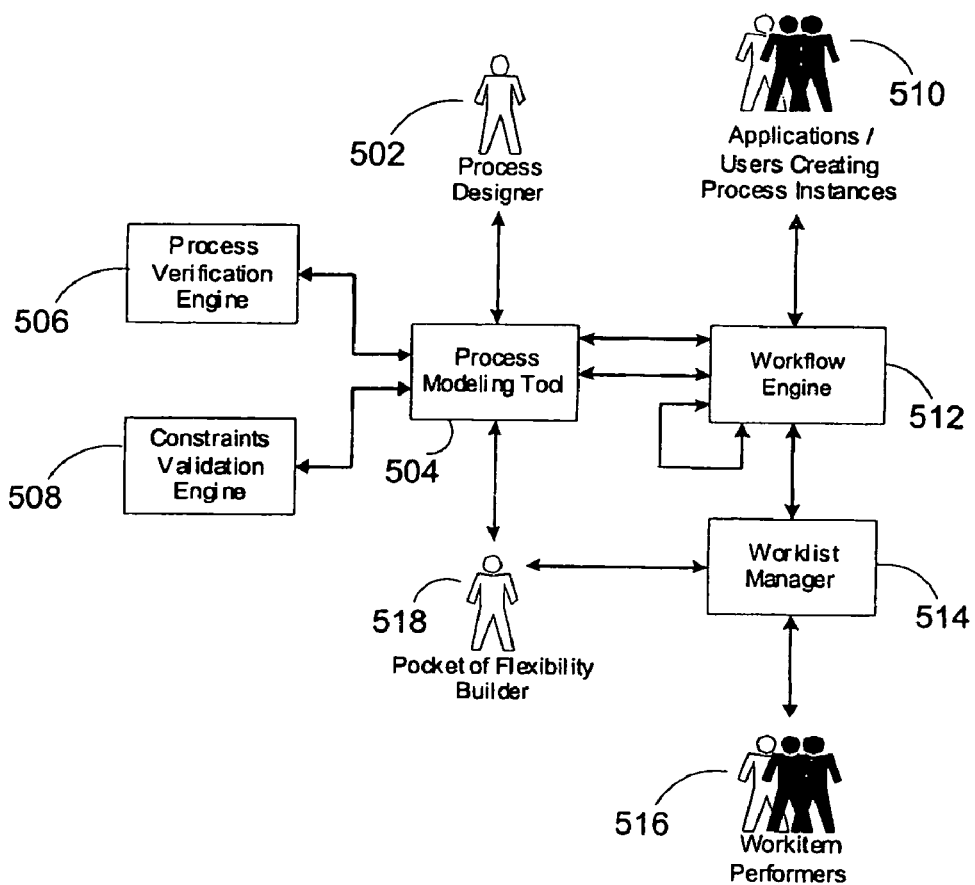
FIG. 5 is a block diagram of a flexible workflow architecture.

FIG. 5 is a block diagram of a flexible workflow architecture 500. In the workflow architecture 500, as described above, a flexible workflow comprising a core process and one or more pockets of flexibility within the core process may be implemented. The workflow architecture concretizes the pocket(s) at runtime using build activities, which results in instance templates for particular instances.

In FIG. 5, a process designer 502 designs a process model using a process modeling tool 504. The process model may include the core process(es), as well as one or more pockets of flexibility. The process model may then be verified for consistency and validity by a process verification engine 506.

A constraints validation engine 508 is then available to be used for checking any constraints that are imposed on fragments within the pocket(s) of flexibility. That is, as discussed herein, fragments within a pocket of flexibility may have various constraints that are designed to govern possible interactions and combinations of the fragments during an instantiation of a given workflow (e.g., that certain fragments must appear in a certain order with respect to one another, or that certain fragments necessitate (or prohibit) inclusion of other fragments).

The constraints validation engine 508 acts to ensure that such constraints are optimized and consistent. For example, the constraints validation engine 508 may eliminate redundancies between the constraints. As another example, the constraints validation engine may ensure that the constraints are consistent with one another, such that every fragment is available for use in at least one instance template.

Once the process model has been verified and its constraints validated, the process model may be made available for use. In use, applications and/or users 510 initiate the copying of the process model into an open instance, using a workflow engine 512. Then, a worklist manager 514 dispenses tasks of the workflow for enacting by one or more of a group of workitem performers 516.

When the workflow engine 512 comes upon a build activity within the open instance of the workflow, it communicates with the process modeling tool 504. A pocket of flexibility builder 518 interacts with the process modeling tool 504 to perform a selection of appropriate fragments from the build activity, and this selection is verified by the process verification engine 506.

Additionally, constraints specific to the selected fragments are checked for validity by a constraints validation engine 508. That is, in addition the constraint validation performed above for ensuring a minimal level of consistency with respect to all the constraints and fragments, the constraints validation engine 508 ensures that the constraints and fragments actually selected for a particular instance template are inter-operable.

An example implementation of the workflow architecture 500 of FIG. 5 is discussed in more detail below with respect to FIGS. 6-10. Specifically, the implementation deals with a Customer Relationship Management (CRM) setting, in which a customer has contacted a call center for assistance in resolving a technical problem.

Figure 6:
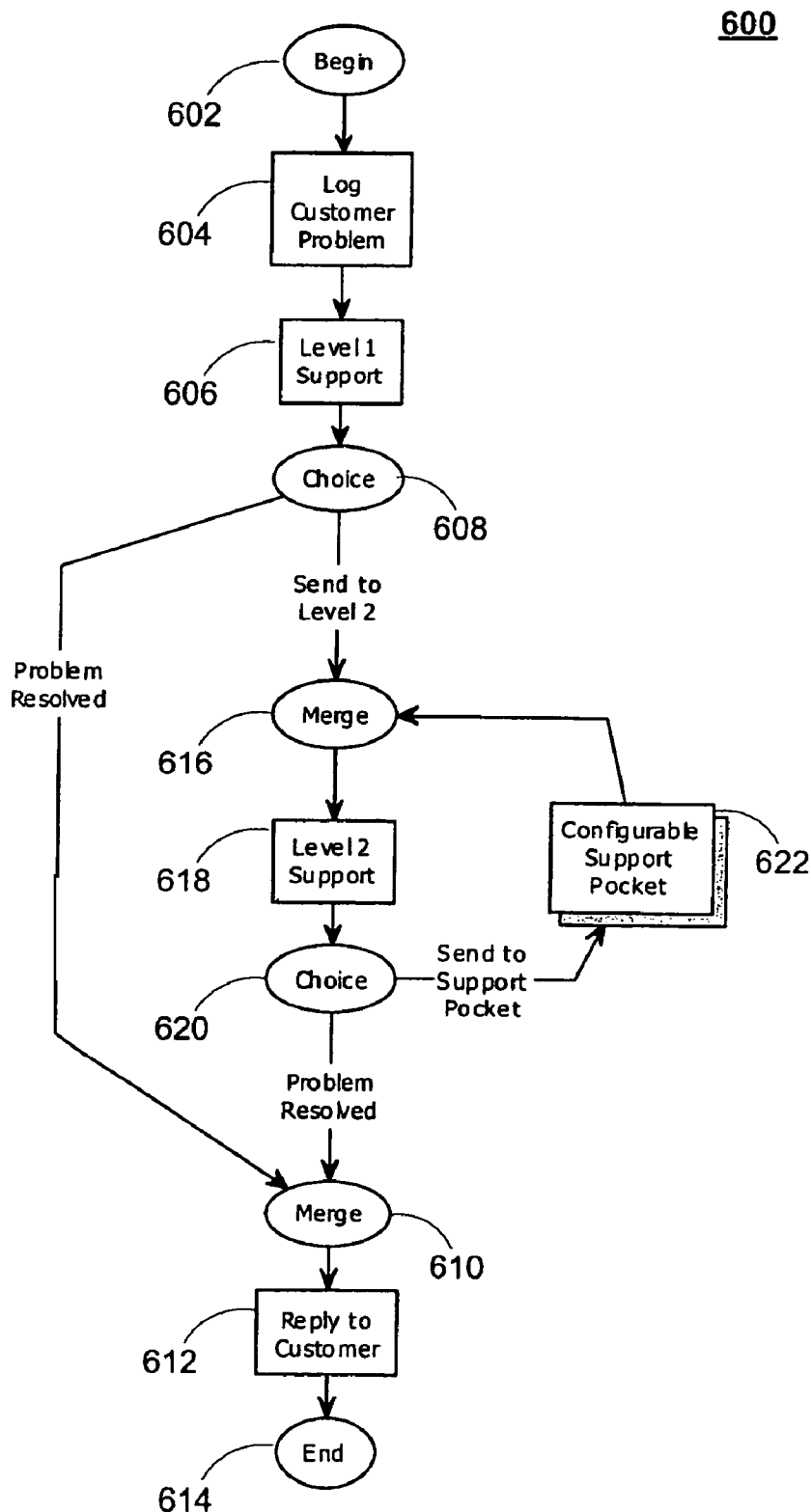
FIG. 6 is a block diagram of a workflow.

FIG. 6 is a block diagram of a workflow 600. More specifically, the workflow 600 may represent a process model (and/or an open instance of a process model) for providing technical support to a customer at a customer call center. It should be understood from FIG. 5 that the workflow 600 may be created by the process designer 502 using the process modeling tool 504, and the open instance of the process model may be initiated by the application/users 510 using the workflow engine 512.

In FIG. 6, a begin command 602 leads to a task 604 for logging a problem presented by a customer. After being accepted and logged by, for example, a front-end consultant, the problem is passed on to a task 606 for a first level of support. The first level of support might include, for example, a relatively low-skill, low-pay technical support person, qualified to handle various low-level technical support issues, but not competent to advise customers on more detailed or complicated problems.

If the support person at the first level of support is capable of solving the customer's problem, then a choice task 608 allows the resolved problem to proceed immediately to a merge task 610, skipping any intermediate tasks. Then, a task 612 includes the issuing of a reply to the customer and a subsequent end 614 of the workflow. It should be understood from FIG. 5 that the tasks 604, 606, and 612 may be performed by the workitem performers 516, who may receive their instructions from the workflow engine 512, via the worklist manager 514.

If the first level of support is not capable of resolving the problem, then the choice task 608 forwards the problem, via a merge task 616, to a second level of support 618. Again, if the second level of support is capable of resolving the problem, then a choice task 620 forwards the resolved problem back to the merge task 610.

If the second level of support is not capable of resolving the problem, perhaps because the problem is a rare or new problem for which no well-defined resolution exists, then the choice task 620 forwards the problem to a configurable support pocket 622, which may contain a build activity having a number of workflow fragments that may be useful in resolving the customer problem.

The configurable support pocket 622 (i.e., fragments contained therein) is sent to the pocket of flexibility builder 518, who configures the fragments into a valid, suitable instance template. The builder 518 may interact with the configurable support pocket 622, and thereby the workitem performers 516, using the worklist manager 514 and/or using the workflow engine 512 and process modeling tool 504.

The builder 518 may be an expert user who is capable of configuring the support pocket 622. In FIG. 6, the builder 518 may be a staff member at the second level of support, or may be a supervisor who is not normally involved in directly responding to customer calls.

Figure 7:
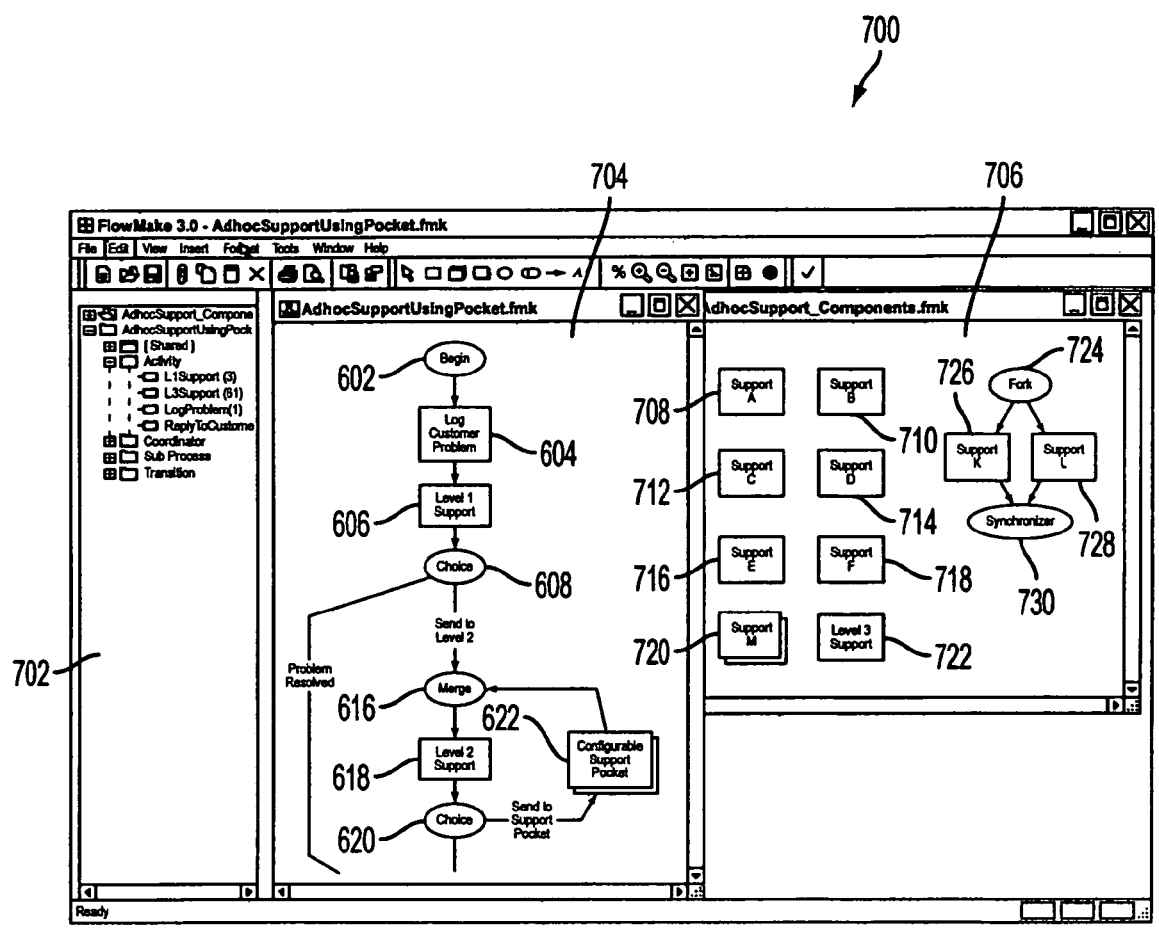
FIG. 7 is a screenshot of a user interface providing a modeling tool for creating an instance template corresponding to the configurable support pocket of FIG. 6.

FIG. 7 is a screenshot 700 of a user interface providing a modeling tool for creating an instance template corresponding to the configurable support pocket 622 of FIG. 6. In FIG. 7, a section 702 provides a file menu allowing selective viewing and use of related workflow information. For example, in FIG. 7, a menu has been chosen which causes a section 704 to be displayed within the screenshot 700, where the section 704 displays the workflow 600 of FIG. 6. Similarly, a section 706 has been selected for viewing fragments associated with the configurable support pocket 622, for viewing and use by the builder 516.

Specifically, the section 706 illustrates a task 708 for a support activity referred to as Support A, a task 710 for a support activity referred to as Support B, a task 712 for a support activity referred to as Support C, a task 714 for a support activity referred to as Support D, a task 716 for a support activity referred to as Support E, a task 718 for a support activity referred to as Support F, and a task 720 for a support activity referred to as Support G. Each of these tasks represents potential support tasks that may be undertaken to resolve a customer issue.

Similarly, the section 706 illustrates a task 722 for a third level of support. The section 706 further illustrates a pre-compiled set of fragments, including a fork task 724, a task for a support activity referred to as Support K, a task for a support activity referred to as Support L, and a synchronizer task 730. The pre-compiling of this set of fragments reflects a related, pre-determined constraint that may not be violated during the instantiation of the configurable support pocket 622. Specifically, in this case, the tasks 726 and 728 must be performed together (i.e., one must not be performed without the other).

Figure 8:
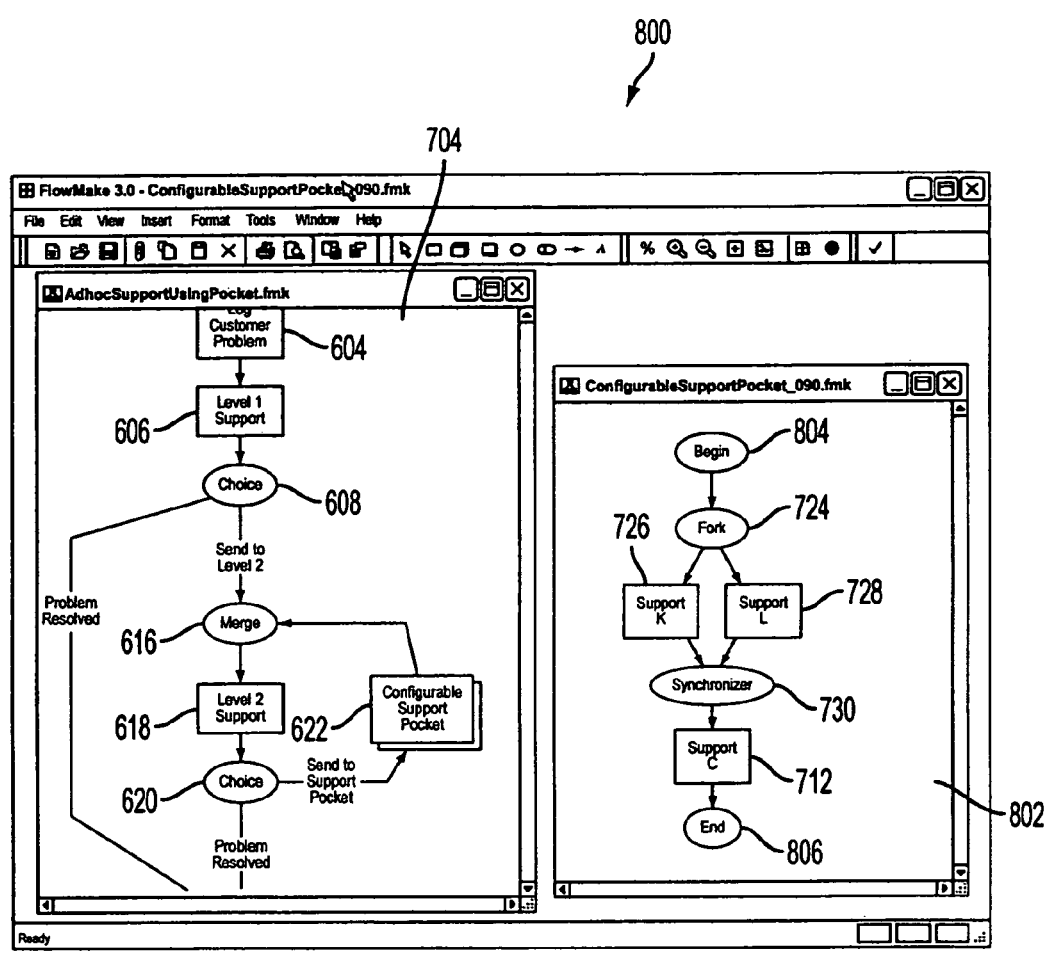
FIG. 8 is a screenshot illustrating a composition of a workflow sub-process for the configurable support pocket of FIG. 6.

FIG. 8 is a screenshot 800 illustrating a composition of a workflow sub-process for the configurable support pocket 622 of FIG. 6. In FIG. 8, a section 802 demonstrates a workflow that starts with a begin command 804, includes the fork task 724, tasks 726 and 728, the synchronizer task 730, the task 712, and an end task 806. The configured workflow of section 802 thus represents a (part of an) instance template, i.e., a process model for providing customer support in a particular setting, and may be exported to the workflow engine 510 for distribution by the worklist manager 512 and the work-item performers 514 (i.e., in this case, second-level support staff).

As should be understood, one potential advantage of the above-described techniques is related to the ability to dynamically build instance templates, while having confidence that the built instance template is in accordance with prescribed business process constraints. These techniques not only integrate the process of change into the workflow process itself, but also allow domain experts (who would typically have a greater understanding of the business requirements) to define a process for a given business case/workflow instance, which is reflective of the particular requirements of that case. As a result, process improvements are obtainable that may not be possible or practical in generic, predefined approaches.

By allowing end users, that is, domain experts, to define the templates, an interface that may be more intuitive, friendly and/or domain specific than typical workflow modelling and editing tools may be used. To support template building, a wizards-based approach may be used, in which build options for (fragments within) build activities are progressively reduced as selections are made.

Such an interface may allow users to choose fragments and compose them incrementally. Thus, rather than having a complete verification of the built template at the end of the template-building, when it may be difficult to track constraint violations, each change operation may be followed by verification by the constraints validation engine 508, and a corresponding reconfiguration of available fragments. This will reduce (increase) available options for users in accordance with the specified constraints. In cases where a particular choice of fragments and/or composition reduces available options to one or zero, the interfacing tool may itself complete building of the remaining template.

Figure 9:
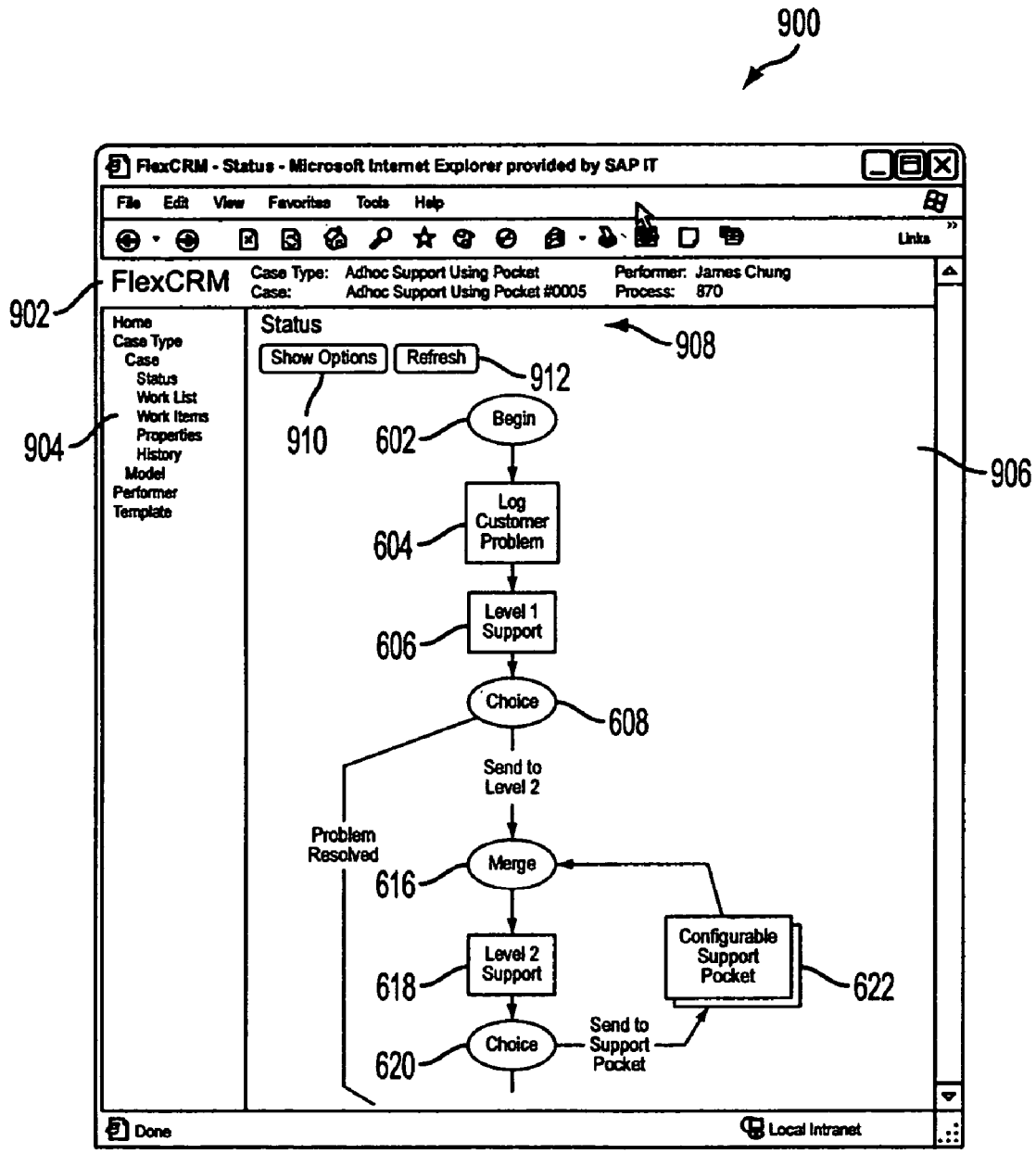
FIG. 9 is a screenshot of a status graph showing a status of the workflow of FIG. 6.

FIG. 9 is a screenshot 900 of a status graph showing a status of the workflow 600 of FIG. 6. In FIG. 9, a section 902 provides information about the process, the instance, and one or more of the workitem performers 516. A section 904 provides links to related information, and a section 906 shows status information about the workflow 600, or, more particularly, about the particular instance of the workflow 600. A sub-section 908 provides additional user options related to status information, including a button 910 for displaying more status options and a button 912 for refreshing the section 906.

The workflow 600 may be displayed in various ways to demonstrate its current status, such as which of the included tasks is currently active. For example, a color of the corresponding task could be changed, or the task could be highlighted or otherwise designated on the screen.

Figure 10:
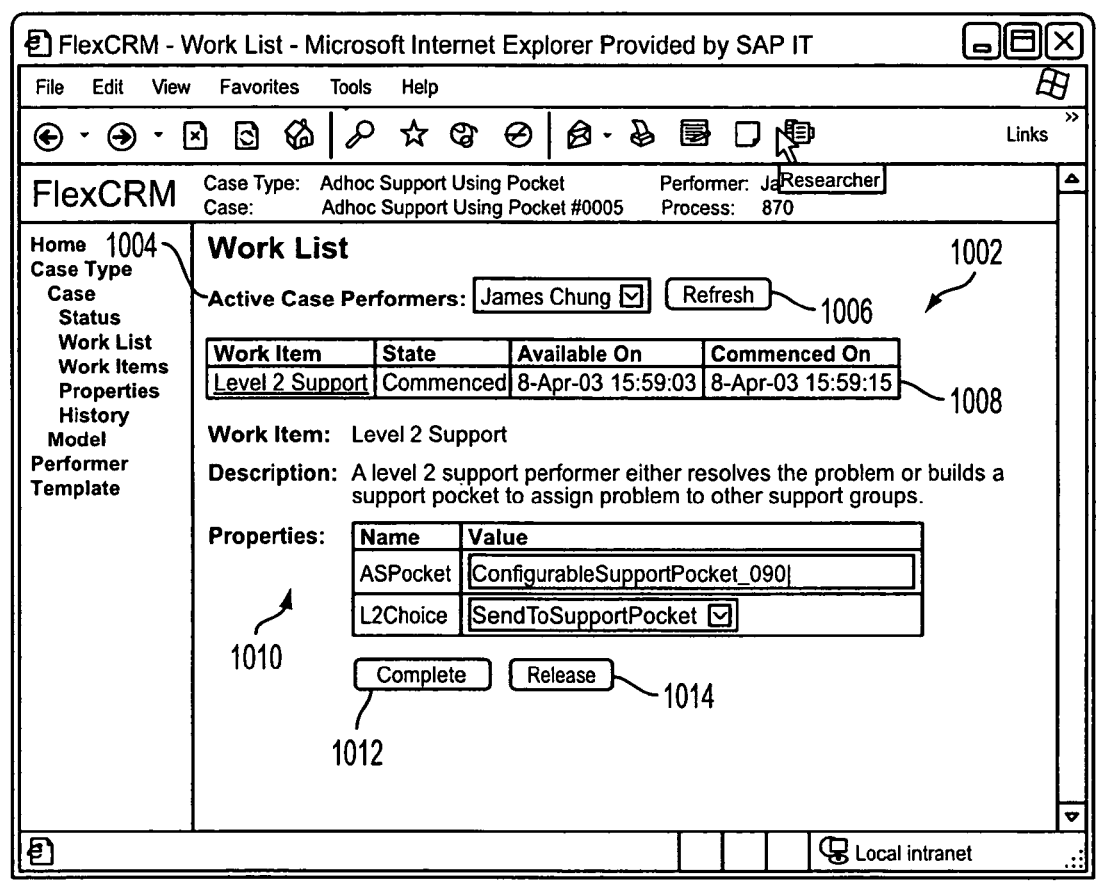
FIG. 10 is a screenshot for showing work item details for a task within the workflow of FIG. 6.

FIG. 10 is a screenshot 1000 for showing work item details for a task within the workflow 600 of FIG. 6. In FIG. 10, the work item details are displayed in a section 1002, and relate to the task 618 for second level support staff. In the section 1002, a line 1004 identifies a currently-active case performer performing the work item, and a button 1006 allows this information to be updated/refreshed.

A sub-section 1008 identifies characteristics of the work item, including its name, state, and dates of availability and commencement. Another sub-section 1010 further identifies the work item, including a name, description, and properties of the work item. As can be seen, the properties information includes an identification of the configured support pocket (instance template) of section 802 of FIG. 8, as well as an ability to send this configured support pocket to the workflow engine 512.

A button 1012 allows a user of the screenshot 1000 to complete entry of information into the various fields of the screenshot 1000. A button 1014 allows the user to release the information to, for example, the workflow engine 512.

In implementing the above-described techniques, various ad-hoc modifications also may be provided. Ad-hoc modification are defined to include any unexecuted part of the instance template that may be modified at runtime. Such modifications are possible since the workflow engine 510 provides the ability to modify instance templates, even in the absence of a dedicated pocket. In such ad-hoc modifications, however, changes to the instance templates take place after instantiation. In contrast, in the case of a pocket such as the configurable support pocket 622, the change takes place on its sub-process, which has not been instantiated as yet. Thus, the use of a dedicated pocket may allow greater control over allowable changes at runtime.

In the above discussion, the components to build a pocket of flexibility (or process) are fragments and constraints. A core template also may be used, where such a core template represents a pre-defined part of the pocket (process). In this case, the given fragments and constraints may be used to build upon the core template, rather than an empty space.

In FIGS. 1-10, as illustrated in the flowchart 300 of FIG. 3, techniques are described for designing and implementing a workflow model that includes one or more pockets of flexibility, e.g., build activities. More specifically, as has been described, the architecture model 500 may be used to design a process model, such as the process model of FIG. 2 or FIG. 6. The process model includes one or more pockets of flexibility, such as the build activity 216 of FIG. 2 and the configurable support pocket 622 of FIG. 6. The pockets of flexibility include workflow fragments, such as the fragments 224, 226, and 228 of FIG. 2, and the fragments 708-728 of FIG. 7. As already described, the fragments may be combined in a preferred manner, at runtime and subject to various constraints, into a concretized workflow process that is incorporated into execution of the overall process model.

The following discussion further explains and describes the above-recited features. For example, with respect to the flowchart 300 of FIG. 3, further explanation and examples are provided with respect to the designing of the process model (304) and to the compilation of the fragments (314). It should be understood from the above discussion that these techniques may be implemented in, or in conjunction with, the constraints validation engine 508 of FIG. 5.

More particularly, with respect to the design of the process model (304), the below discussion describes techniques for selecting and using constraints. For example, constraints may be selected, perhaps with the aid of user input, so as to minimize redundancy and eliminate conflicts between the constraints. As part of the process model, these techniques apply in some sense to any (potential) instance of the process model (e.g., combination of fragments) that is (or may be) ultimately created. That is, these techniques ensure that every fragment may be used in at least one valid combination of fragments.

With respect to the compilation of the fragments (314), techniques are discussed for minimizing conflicts or inconsistencies between the fragments (or set(s) of fragments) for any particular instance. That is, such techniques may be dependent upon (previous) fragment selections made by a user of the workflow model. As described herein, such selections may be made by the user on a user interface that provides a progressive series of choices for selecting the workflow fragment(s), in which future selections are limited based on past selections. As a result, these techniques ensure that (a combination of) selected fragments can be combined with one another in a valid way.

For the purposes of both designing the process model (304) and compiling the build activities (314), a terminology is set forth below for the following discussion(s) of constraints. Specifically, in the following discussion, F represents a set of fragments, where f∈F represents a fragment as a sub-process (or a single activity). Also, |F|=n represents the number of fragments in F, while $F_m \subseteq F$ where m=1, 2, . . . . Further, C is a set of constraints, where ConstraintType (C) represents the constraint type of C.

W represents a workflow graph representing the core template, and P represents a pocket (process) given as P=<W, F, C>, where W and/or C may be empty. T is a workflow representing the target template that is intended to be dynamically built for a given P. Additionally, there may be a mapping from P→T, where one pocket may map to several templates. In this case, in order for T to be a valid template, all constraints $c_1$, $c_2$, . . . $c_n \in C$ as given in P=<W, F, C> must hold in T, that is $c_1 \hat{} c_2 \hat{} \ldots \hat{} c_n$ must be true.

Using the above-described terminology, FIGS. 11-14 and the associated discussion below provide explanations and examples of providing constraints to be associated with workflow fragments within a pocket of flexibility, as part of designing a corresponding process model (304).

Figure 11:
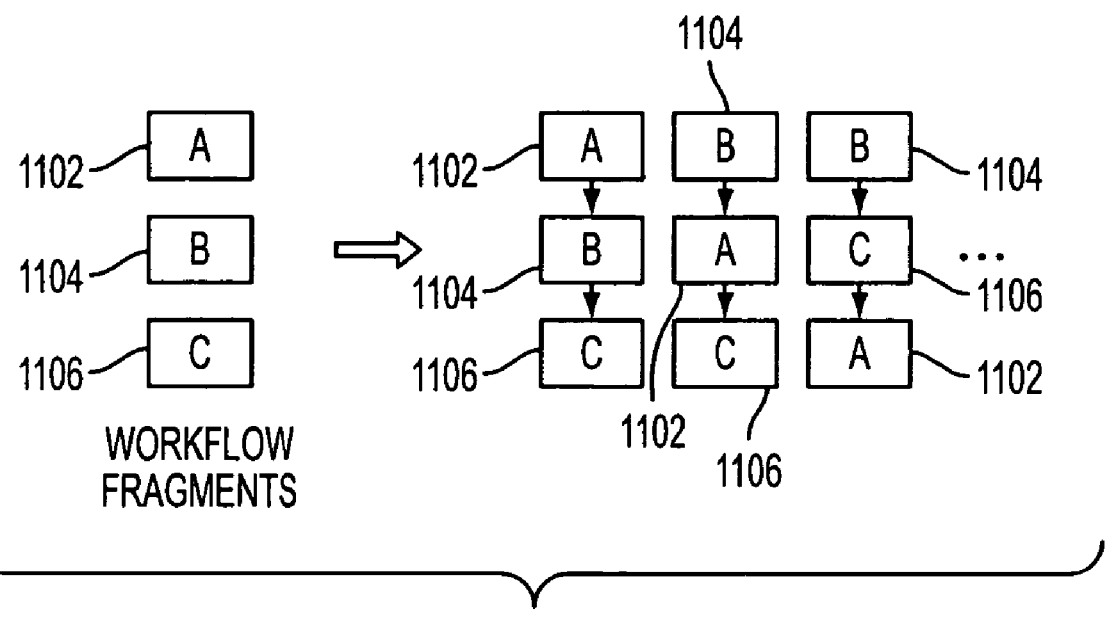
FIG. 11 is a block diagram illustrating a serial constraint on workflow fragments.

FIG. 11 is a block diagram illustrating a serial constraint on workflow fragments. Specifically, FIG. 11 illustrates that a workflow fragment A 1102, a workflow fragment B 1104, and a workflow fragment C 1106 may be arranged serially in any one of a plurality of orders. That is, a choice of order of the fragments 1102, 1104, and 1106 remains flexible and may be determined, for example, by the user during an actual composition of the fragments 1102, 1104, and 1106 as part of a build activity. For example, the fragments 1102, 1104, and 1106 might represent the fragments 224, 226, and 228 within the build activity 216 of FIG. 2.

In short, in the serial constraint of FIG. 11, the statement "fragment A 1102 is followed by fragment B 1104" does not necessarily indicate a control flow dependency between the fragments 1102 and 1104. Rather, the serial constraint of FIG. 11 is designed to fulfill constraints such as "Do all of fragment A 1102, fragment B 1104, and fragment C 1106, but one at a time." Somewhat similarly, a further expansion of compositions is illustrated by a serial constraint such as "Perform any fragment from a given set of fragments, but one at a time."

The serial constraint of FIG. 11 does not imply consecutive placement. That is, the fragments 1102, 1104, and 1106 may have other workflow activities placed between them. Also, the serial constraint of FIG. 11 does not put any restriction on the number of fragments that must be included in the resulting template.

An example of the serial constraint of FIG. 11 might includes a situation in which a number of tests have been prescribed for a given patient, such as a blood test, an X-Ray, and an Electro-Cardiogram (ECG). These tests can be done in any order, but are generally performed one at a time, and the order may generally be selected at the discretion or preference of the user (e.g., physician).

In the following discussion, the serial constraint of FIG. 11 may be referred to as $S(F_m)$, where $F_m$ is a non-empty subset of F. Thus, $S(F_m)$ may be represented as $S(\{f_1, f_2, \ldots f_n\})$; $f_i \epsilon F_m$ for $i=1, \ldots n$. Using this terminology, the serial constraint $S(F_m)$ may be defined such that, for a given $S(F_m)$, $F_k$ is a subset of $F_m$, such that all fragments in $F_k$ are present in T. Then $\forall f_i, f_j \epsilon F_k$, there exists a unique path between them in T.

The serial constraint $S(F_m)$ of FIG. 11 includes the special case of an order constraint, in which fragments are executed in sequence as well as in a specified order. However, like the serial constraint $S(F_m)$, the order constraint does not imply consecutive placement, that is, the fragments may have other workflow activities placed between them.

An example of the order constraint can be seen in the way applications for admission into a university program may be processed by the admission section and the faculty section of the university. In such a case, the admission section may receive the applications, screen them for missing documents, and, in most cases, determine eligibility. In certain cases, however, a recommendation of the faculty may be required to determine academic eligibility. Such a recommendation may be requested at any stage, provided the application has been screened for missing documents by the admission section before being received by the faculty.

In the following discussion, the order constraint may be referred to as $O(F_m)$, where $F_m$ is a non-empty subset of F. Thus $O(F_m)$ may be represented as $O(\{f_1, f_2, \ldots f_n\})$; $f_i \epsilon F_m$ for $i=1, \ldots n$. $O(F_m)$ provides an order on the elements of $F_m$. Using this terminology, the order constraint $O(F_m)$ may be defined such that, for a given $O(F_m)$, $F_k$ is a subset of $F_m$, such that all fragments in $F_k$ are present in T. Then $\forall f_i, f_{i+j} \epsilon F_k$ where $i=1 \ldots n-1$ and $j=1 \ldots n-i$, there exists a path from $f_i$ to $f_{i+j}$ in T. As with the serial constraint $S(F_m)$, a choice of fragments in $F_k$ may be user-driven.

Figure 12:
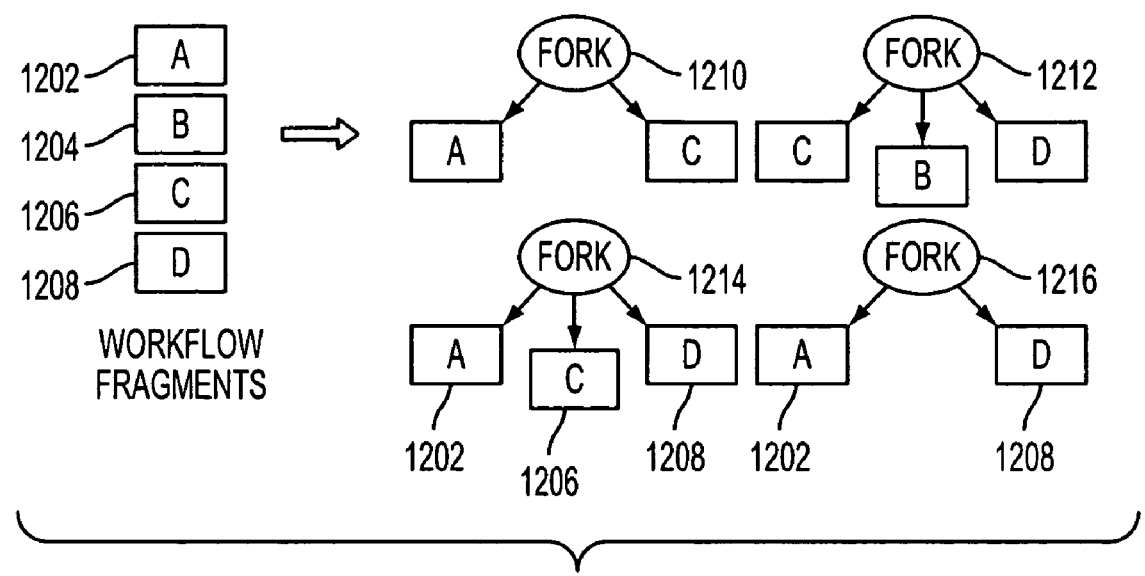
FIG. 12 is a block diagram illustrating a fork constraint on workflow fragments.

FIG. 12 is a block diagram illustrating a fork constraint on workflow fragments. In FIG. 12, the fragments include a fragment A 1202, a fragment B 1204, a fragment C 1206, and a fragment D 1208. For example, such a fork constraint can be phrased as "do no more than 3 of fragment A 1202, fragment B 1204, fragment C 1206, or fragment D 1208."

Specifically, FIG. 12 illustrates that a fork 1210 may lead to the fragment A 1202 and/or the fragment C 1206, while a fork 1212 may lead to the fragment C 1206, the fragment B 1208, and/or the fragment D 1208. A fork 1214 may lead to the fragment A 1202, the fragment C 1206, and/or the fragment D 1208. Finally in FIG. 12, a fork 1216 may lead to the fragment A 1202 and/or the fragment D 1208.

Execution according to the fork constraint of FIG. 12 does not necessarily imply parallel execution, since activities present on the multiple outgoing branches of a fork may be activated in any order. Furthermore, the fragments may appear in fork structures together with other workflow activities.

An example of the fork constraint of FIG. 12 may include a situation in which a number of study activities are designed within a course. In such a case, a student may be expected to undertake at least three of the activities during a given period of time.

In the following discussion, the fork constraint may be referred to as $F(F_m)$ where $F_m$ is a non-empty subset of F. Thus $F(F_m)$ may be represented as $F(\{f_1, f_2, \ldots f_n\})$; $f_i \epsilon F_m$ for $i=1, \ldots n$. Using this terminology, the Fork constraint $F(F_m)$ may be defined such that, for a given $F(F_m)$, $F_k$ is a subset of $F_m$, such that all fragments in $F_k$ are present in T. Then $\forall f_i, f_j \epsilon F_k$, there does not exist a path between them in T. As with the serial and order constraints discussed above, a choice of fragments in $F_k$ may be user-driven.

The constraints discussed above may be considered "structural" constraints, in that they refer to how a given set of fragments may be composed within a template. A second type of constraint may be considered to be "containment" constraints, which refer to whether a particular fragment(s) may be included (contained) within a template.

Figure 13:
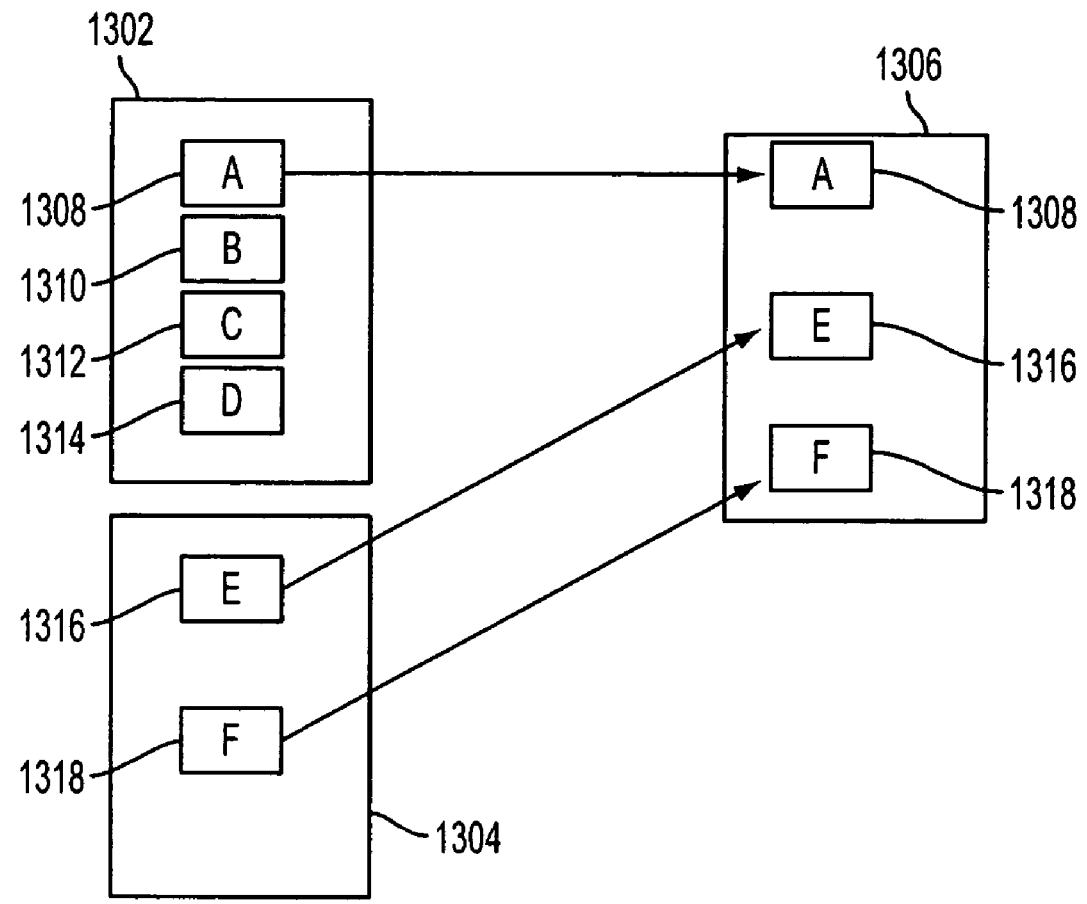
FIG. 13 is a block diagram illustrating an action of an inclusion type of a containment constraint.

FIG. 13 is a block diagram illustrating an action of an inclusion type of a containment constraint. FIG. 13 includes a first set 1302 of fragments, a second set of fragments 1304, and a third set of fragments 1306, where the third set 1306 of fragments represents a pocket of flexibility that has been concretized based on fragments within the first set 1302 and/or the second set 1304 (i.e., a template). The first set 1302 of fragments includes a fragment A 1308, a fragment B 1310, a fragment C 1312, and a fragment D 1314. The second set 1304 of fragments includes a fragment E 1316 and a fragment F 1318.

In FIG. 13, the inclusion constraint identifies a dependency between the fragment A 1308 and the fragments E 1316 and the fragment F 1318, such that inclusion of the fragment A 1308 within the third set 1306 necessitates inclusion of the fragment E 1316 and the fragment F 1318. In other words, generally speaking, a presence (or absence) of fragments from one set imposes a restriction on the fragments of the second set. The inclusion constraint can be supplemented with a serial/order or fork constraint that imposes an additional restriction on how the included fragments must be composed.

An example of the inclusion type of containment constraint exists in travel booking, where a customer making a booking for both flight and accommodation will be provided by free transport from/to the airport. That is, inclusion of the "flight booking" fragment and the "accommodation" fragment necessitates inclusion of the "transport" fragment.

In the following discussion, the inclusion constraint may be referred to as $I(F_p, F_m)$ where $F_p$ and $F_m$ are two non-empty subsets of F. Thus $I(F_p, F_m)$ may be represented as $I(\{f_1, \ldots f_q\}, \{f_1 \ldots f_n\})$; $f_i \epsilon F_p$ for $i=1, \ldots q$; $f_j \epsilon F_m$ for $j=1, \ldots n$. Using this terminology, at least two cases may occur. Specifically, if all fragments from $F_p$ are present in T then all fragments from $F_m$ must appear in T; conversely, if not all the fragments from $F_p$ are present in T then no rule is enforced on $F_m$.

Figure 14:
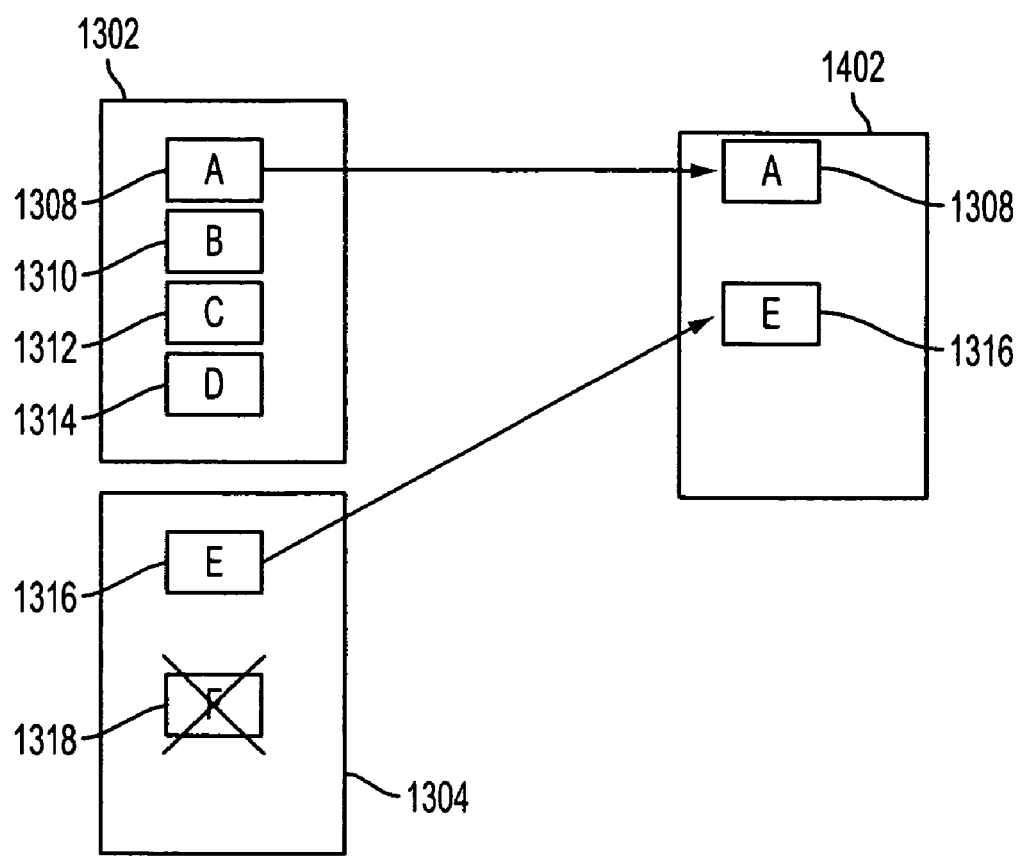
FIG. 14 is a block diagram illustrating an action of an exclusion type of a containment constraint.

FIG. 14 is a block diagram illustrating an action of an exclusion type of a containment constraint. In FIG. 14, the exclusion constraint acts on the same sets 1302 and 1304 of fragments as in FIG. 13, and achieves a set 1402 of fragments that includes the fragment A 1308 and the fragment E 1316.

More specifically, the exclusion constraint acts to identify a dependency between the sets 1302 and 1304 of fragments, such that a selection of one (or more) fragment(s) (here, the fragment A 1308 and the fragment E 1316) prohibits selection of another fragment(s) (here, the fragment F 1318) for inclusion in the resulting set (i.e., template) 1402. In FIG. 14, the fragment E 1316 is selected based on selection of the fragment A 1308; however, the fragment E 1316 may be selected (and fragment F therefore excluded) without being based on an earlier selection of another fragment.

An example of the exclusion constraint may be seen in company travel reimbursements. For example, such reimbursements may be made in at least two ways: by check or by direct deposit. In a particular instance, inclusion of one should exclude the other, so that the reimbursement recipient is not paid twice for the same expense.

In the following discussion, the exclusion constraint may be referred to as $E(F_p, F_m)$ where $F_p$ and $F_m$ are two non-empty subsets of F. Thus $E(F_p, F_m)$ may be represented as $E(\{f_1, \ldots f_q\}, \{f_1 \ldots f_n\})$; $f_i \in F_p$ for $i=1, \ldots q$; $f_j \in F_m$ for $j=1, \ldots n$. Using this terminology (and similarly to the inclusion constraint), at least two cases may occur. Specifically, if all fragments from $F_p$ are present in T, then all fragments from $F_m$ must not appear in T. Conversely, if not all the fragments from $F_p$ are present in T, then no rule is enforced on $F_m$.

In addition to the five constraints (i.e., serial, order, fork, inclusion, exclusion) introduced and defined above, many other constraint type variations also may be used. For example, although the serial and order constraints, as defined above, do not require consecutive placement, an additional (or alternative) constraint might include such a requirement. Similarly, the fork constraint does not require parallel execution, yet an additional (or alternative) constraint might include such a requirement.

Moreover, entirely different types of constraints may be used, in addition to (or instead of) the various constraint types discussed above. For example, "minimum/maximum" constraints may be used to impose a restriction on how many fragments must be included in a template. For example, if $F(F_m)$ is given and $|F_m|=n$, then any $k \leq n$ fragments may be included. However, it may be necessary to more precisely specify the parameter k for certain processes.

A constraint type to capture such a restriction may be defines as a max constraint, defined as $X(F_m, k)$, where at most k elements from $F_m$ must be included. Somewhat similarly, a min constraint may be defined as $N(F_m, k)$, where at least k elements from $F_m$ must be included.

Another example of a constraint is a "multiple" constraint, designed to deal with workflows having multiple iterations and/or executions. For example, workflow graphs may contain "arbitrary cycles," in which a sub process may be encapsulated in a typical do-while/repeat-until construct, with a given condition for iteration. As another example, "multiple executions" may refer to a situation in which a sub process may be required to be concurrently executed any k number of times, for example to fulfill the constraint "Perform a fragment k number of times," where k is instance-dependent.

In cases where the allowable number of multiple executions of an activity (sub-process) is known, the activity may be represented multiple times in the fragment set, but with unique identification parameters. For example, if a document can be reviewed up to 3 times, then a fragment set may be given as F={f1, f2, . . . Review1, Review2, Review3, . . . fn}, where the embedded task logic for all three of Review1, Review2, and Review3 is the same. A fork (or serial) constraint may then be defined, such as F({f1, . . . Review1, Review2, Review3, . . . }), thus allowing multiple executions of the same activity.

When the number of allowable multiple executions is unknown, a new constraint type may be introduced. Such a constraint type may be defined as M ($F_m$), such that $\forall f_i \in F_m$ for $i=1, 2, \ldots n$, multiple executions of $f_i$ are permissible in T.

Figure 15:
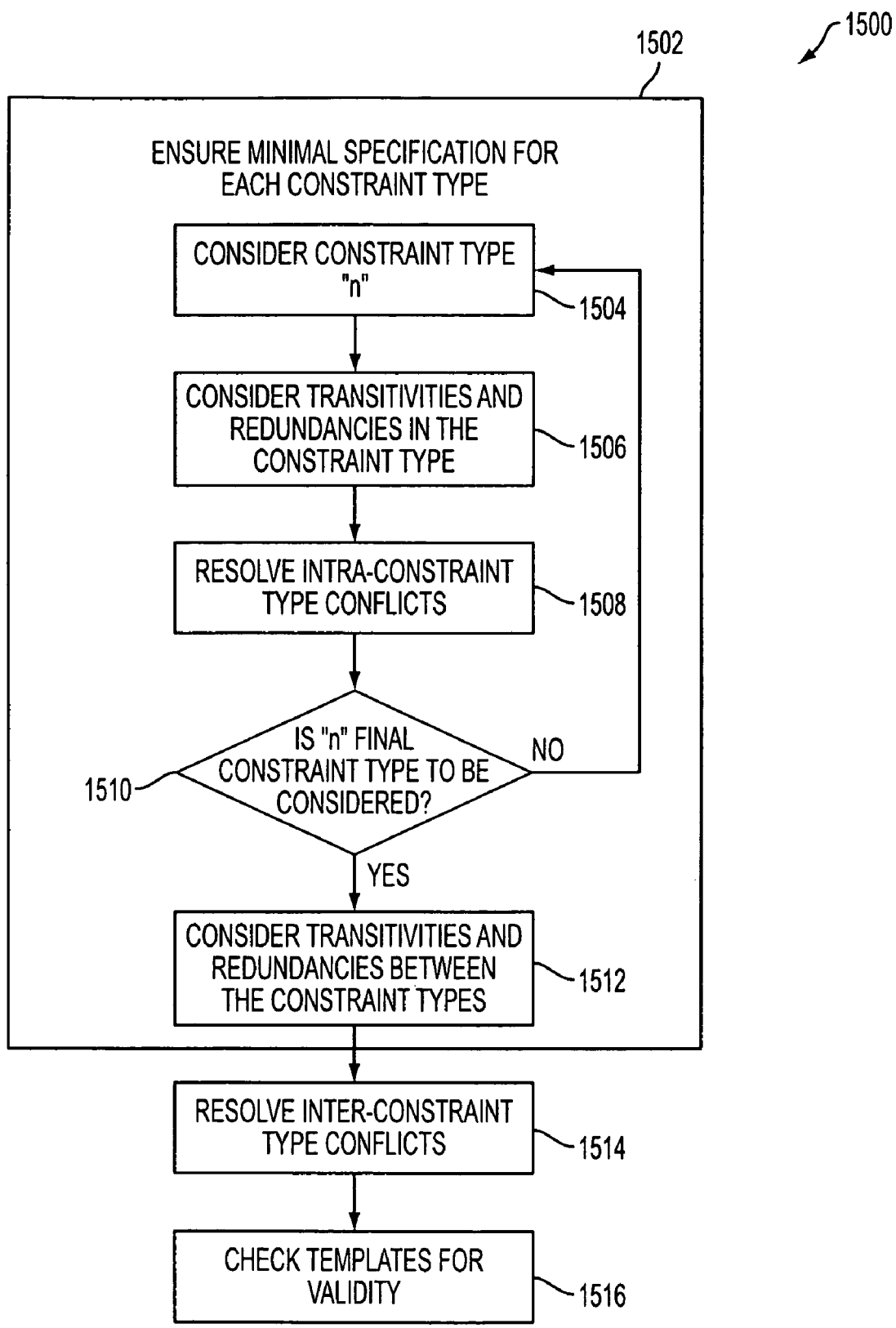
FIG. 15 is a flowchart illustrating techniques for optimizing a use of constraints in implementing a pocket of flexibility.

FIG. 15 is a flowchart 1500 illustrating techniques for optimizing a use of constraints in implementing a pocket of flexibility. Such constraints may include, for example, the various constraints set forth above, including the serial and order constraints discussed with respect to FIG. 11, the fork constraint discussed with respect to FIG. 12, the inclusion constraint discussed with respect to FIG. 13, and the exclusion constraint discussed with respect to FIG. 14.

In FIG. 15, a minimal specification of the constraints is obtained (1502). More specifically, a first constraint "n" of the various types of constraints to be considered (e.g., a structural constraint type such as the order constraint type, or a containment constraint, such as the inclusion or exclusion constraint type) is selected (1504). The constraint type "n" is then examined for any properties such as, for example, transitivities and/or redundancies (1506). Using these properties, constraints of the constraint type are expressed, or specified, in a concise manner. Techniques for detecting and considering properties for ensuring minimal specification are discussed in more detail below.

In ensuring a minimal specification, conflicts between individual constraints of the constraint type "n" are resolved (1506). In other words, for example, if two order constraints (such as "A must follow B" and "B must follow A") conflict with one another, then such conflicts are resolved. Such resolution may be gained either by way of a pre-determined criteria, and/or by way of user input as to which constraint should take precedence and/or which should be eliminated. Examples of techniques for resolving intra-constraint type conflicts, and how these techniques may be facilitated by use of transitivities and redundancies within the constraint types, are discussed in detail below.

If the constraint type "n" is not the final constraint type to be considered (1510), then a next constraint type is selected (1504) and processed accordingly. Otherwise, redundancies/transitivities between the various constraint types may be considered (1512). Subsequently, the minimal specification may be completed (1502).

It should be understood that the flowchart 1500 of FIG. 15, as with other flowcharts and processes described herein, is intended merely as an example, and does not imply, for example, a requirement of the described order of operations of the various processes. For example, consideration of inter-constraint type transitivities and redundancies (1512) need not be performed after all the constraint types have been individually considered, and could be performed in conjunction with, for example, consideration of intra-constraint type transitivities, redundancies, and/or conflicts.

Once a minimal specification has been reached for each of the constraint types individually (i.e., a concise, intra-constraint type conflict-free specification), conflicts between the different constraint types are considered (1514). For example, a conflict between an order constraint and a fork constraint could occur, in the case where the order constraint specifies "B follows A," while the fork constraint specifies "A forks with (e.g., is in parallel with) B." Similarly, a conflict could occur between a fork and serial constraint, and well as between an inclusion and an exclusion constraint.

Once all intra and inter-constraint conflicts are resolved, then it may be said that every fragment within the associated pocket of flexibility may be included in at least one valid template, and the pocket of flexibility is fully specified within a (presumably otherwise) valid process model. Thus, the operations of flowchart 1500 just described (1502-1514) may be thought to exist as part of designing the process model in flowchart 300 of FIG. 3 (304).

Even though such a process model is considered valid and every fragment may appear in at least one valid template, these facts do not necessarily imply that a particular template, composed of various fragments, is itself valid. Therefore, a template, once compiled from various fragments as described above with respect to the flowchart 300 of FIG. 3 (314), is subsequently checked for validity (1516). This check may be performed automatically, and/or may require user input for resolution.

Various aspects of the flowchart 1500 of FIG. 15 are discussed in more detail below. Further, various examples for implementing the operations described with respect to FIG. 15 also are described in more detail below.

For example, as mentioned above, part of obtaining a minimal specification for each constraint type (1502) may involve consideration of properties of transitivity within the relevant constraint type (1506). For example, the Inclusion, Exclusion and Order Constraints all have a transitivity property. This property can be seen in the Order constraint, in that O({A, B}) and O({B, C}) imply that there is an order constraint on {A, B, C} such that O({A, B, C}) can replace the first two.

Similarly for the Inclusion constraint, I({A}, {B, C}) and I({B}, {D, E}) imply that B, C, D, and E must all be present when A is present. Unlike the Order constraint, however, I({A}, {B, C, D, E}) does not imply I({B}, {D, E}), and as such cannot replace the above two inclusion constraints.

Figures 16A, 16B:
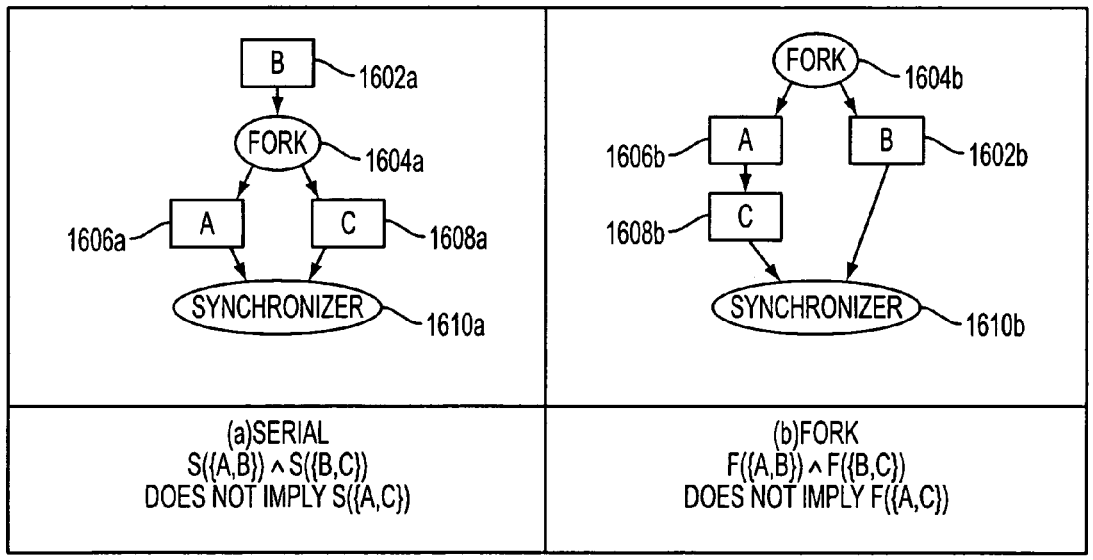
FIGS. 16A and 16B are block diagrams illustrating a non-transitivity property of a serial and fork constraint, respectively.

FIGS. 16A and 16B are block diagrams illustrating a non-transitivity property of a serial and fork constraint, respectively. That is, for a serial constraint, S({A, B}) and S({B, C}) does not necessarily imply S({A, C}). For example, in FIG. 16A, a fragment B 1602*a* leads to a fork 1604*a*, which splits into a task A 1606*a* and a task C 1608*a*, which are then synchronized at a task 1610*a*. In this case, the fragment A 1606*a* and the fragment C 1608*a* are not serial. Nonetheless, the two constraints S({A, B}) and S({B, C}) are satisfied by this construct of FIG. 16A. Thus, transitivity is not implied for the two constraints.

Similarly for the fork constraint, F({A, B}) and F({B, C}) does not imply F({A, C}). This is shown in FIG. 16B, in which a fork task 1604*b* leads to a fragment A 1606*b* in series with a fragment C 1608*b*, which together are in parallel with a fragment B 1602*b*. The fragment C 1608*b* and the fragment B 1602*b* are then joined at a synchronizing task 1610*b*. In this case, fragment A 1606*b* and fragment C 1608*b* are in series with one another, and not subject to a Fork constraint. Nonetheless, the two constraints F({A, B}) and F({B, C}) are satisfied by the construct of FIG. 16B. Thus, transitivity is not implied for the two constraints.

By using transitivities between constraints, where possible, a specification of constraints may be optimized by re-stating the constraint specification in a more concise manner. Similarly, and in addition to analyzing such transitivities, analyzing redundancies between constraints also may be useful in optimizing a given set of constraints, i.e., in obtaining a minimal specification for the constraint type(s) (1502).

For example, in the two order constraints O({A, B, C}) and O({A, B}) are given, O({A, B, C}) subsumes O({A, B}), making the latter constraint redundant. Table 1 below identifies examples of where potential redundancies may exist. Redundancy may exist within constraint types, or it may exist across constraint types (for example, in the case of order and serial constraints).

TABLE 1

|  | Order | Serial | Fork | Inclusion | Exclusion |
| --- | --- | --- | --- | --- | --- |
| Order | ✓ | ✓ | | | |
| Serial | ✓ | ✓ | | | |
| Fork | | | ✓ | | |
| Inclusion | | | | ✓ | |
| Exclusion | | | | | ✓ |

In a more formal example of redundancies between order and serial constraints, if $O(F_m)$ and $S(F_n)$ are given and $|F_m \cap F_n| > 1$, then there is potential redundancy in $S(F_n)$. A trivial case is when $F_n \subseteq F_m$, in which case the entire constraint, $S(F_n)$, is redundant. Thus the stronger constraint of Order will subsume the Serial constraint.

Similarly, within the order constraint, if $O(F_m)$ and $O(F_n)$ are given and $|F_n \cap F_m| > 1$, then there is potential redundancy within these constraints. A trivial case is when $F_n \subseteq F_m$, in which case $O(F_n)$ is redundant. Similarly, there can be redundancy between serial and fork constraints.

With regard to Inclusion and Exclusion constraints, if $I(F_p, F_m)$ and $I(F_q, F_n)$ are given and $F_p = F_q$, then there is redundancy within these constraints. Thus, $I(F_p, F_m)$ can be changed to $I(F_p, F_m \cup F_n)$, making $I(F_q, F_n)$ redundant. Another trivial case of redundancy also exists when $F_p \cap F_m \neq \emptyset$. Thus $I(F_p, F_m)$ can be changed to $I(F_p, F_m - (F_p \cap F_m))$ without any loss. Similarly, there can be redundancy between exclusion constraints.

Although properties such as transitivity and redundancy may be used to optimize constraints for a particular pocket of flexibility, they may not generally prevent fragments from within the pocket from being combined with one another. However, and as referred to above, where intra-constraint conflicts exist, one or more fragments within a pocket of flexibility (e.g., build activity) may be prevented from being included in any valid instance template for the build activity in question.

For example, O({A, B}) and O({B, A}) are conflicting constraints, since both can not be true simultaneously. Thus, any given template containing A and B will not be verified (although a graph containing one of A or B could be verified).

Similar comments apply to the constraints S({A, B}) and F({A, B}), since the serial constraint requires that a path be present between A and B, and the fork constraint requires that a path not be present. Nonetheless, there may be a template constructed that does not contain either A or B that may be verified in spite of the conflict. However, if an additional constraint I({A}, {B}) is included, then together the three constraints will not allow any template containing A to be built.

Table 2 identifies examples of conflicting constraint types. As shown, conflicts can arise within a constraint type (e.g., order, inclusion, exclusion) as well as between constraint types (e.g., fork/serial, fork/order, inclusion/exclusion). This result is consistent with FIG. 15 above, in which both intra-constraint type conflicts (1508) and inter-constraint type conflicts (1514) are considered.

TABLE 2

|  | Order | Serial | Fork | Inclusion | Exclusion |
|---|---|---|---|---|---|
| Order | ✓ |  | ✓ |  |  |
| Serial |  |  | ✓ |  |  |
| Fork | ✓ | ✓ |  |  |  |
| Inclusion |  |  |  | ✓ | ✓ |
| Exclusion |  |  |  | ✓ | ✓ |

With respect to intra-constraint type conflicts, the order constraint type may exhibit a conflict between two order constraints if any pair of fragments is present in both, but in conflicting order. That is, given $O(F_m)$ and $O(F_n)$, there will be a conflict when $\exists f_i, f_j \in F_m$ such that $f_i$ precedes $f_j$ in $F_m$ and $\exists f_s, f_t \in F_n$ such that $f_s$ precedes $f_t$ in $F_n$ and $f_i = f_t$ and $f_j = f_s$.

With respect to the inclusion (exclusion) constraint type, an inclusion (exclusion) constraint may exhibit a conflict when, for example, $I(F_p, F_m)$ and $I(F_q, F_n)$ are given, and $F_p \subseteq F_q$ and $F_m \subseteq F_n$.

Discussion of the inter-conflict type constraints. i.e. how they may exist and how they may be resolved, is provided in more detail below. For example, discussion is provided regarding serial/fork conflicts, order/fork conflicts, and inclusion/exclusion conflicts, and how these conflicts may be resolved with user input.

Using the descriptions above of techniques for understanding and identifying transitivities and redundancies (1504, 1512), and for understanding and identifying intra-constraint type conflicts (1508), the following describes how these concepts may be used to arrive at a minimal specification for a given pocket of flexibility.

Specifically, for example, due to transitivity and redundancy which may exist in constraints, it may not be possible to identify conflicts from an original constraint specification. For example, given a set of order constraints: $O_1(\{A, B, C\})$, $O_2(\{A, C, D, G\})$ and $O_3(\{A, G, B\})$, there is potential redundancy since $|\{A, B, C\} \cap \{A, C, D, G\}| > 1$. There also is transitivity in constraints $O_1$ and $O_2$, since A must precede B, and B must precede C according to $O_1$, and, in turn, C must precede D (and D must precede G) according to $O_2$, indicating an ordering constraint on $\{A, B, C, D, G\}$.

Moreover, $\{A, B, C, D, G\}$ and $\{A, G, B\}$ are in conflict, due to the conflicting orders of the parameters B and G. A resolution of this conflict may rest on the user, since the ordering represents a semantic dependency between B and G. Nonetheless, an identification of this conflict by the system may be necessary to alert the user to the issue (for a corresponding correction) in the first place.

In short, although small sets of constraints and fragment pairs may easily permit identification of intra-constraint type conflicts, the presence of transitivity and redundancy in larger constraint/fragment sets may make conflicts between order constraints difficult to detect. This potential difficulty leads to the minimal specification techniques referred to above with respect to FIG. 15 (1502), as discussed in more detail below.

Specifically, using transitivity and eliminating redundancies, along with constraint-type specific techniques as described below, a minimal, conflict-free constraint set may be specified. In the context of FIG. 15, for example, this implies that, for constraint type "n," n=order, serial, fork, inclusion, and exclusion constraint types.

Figure 17:
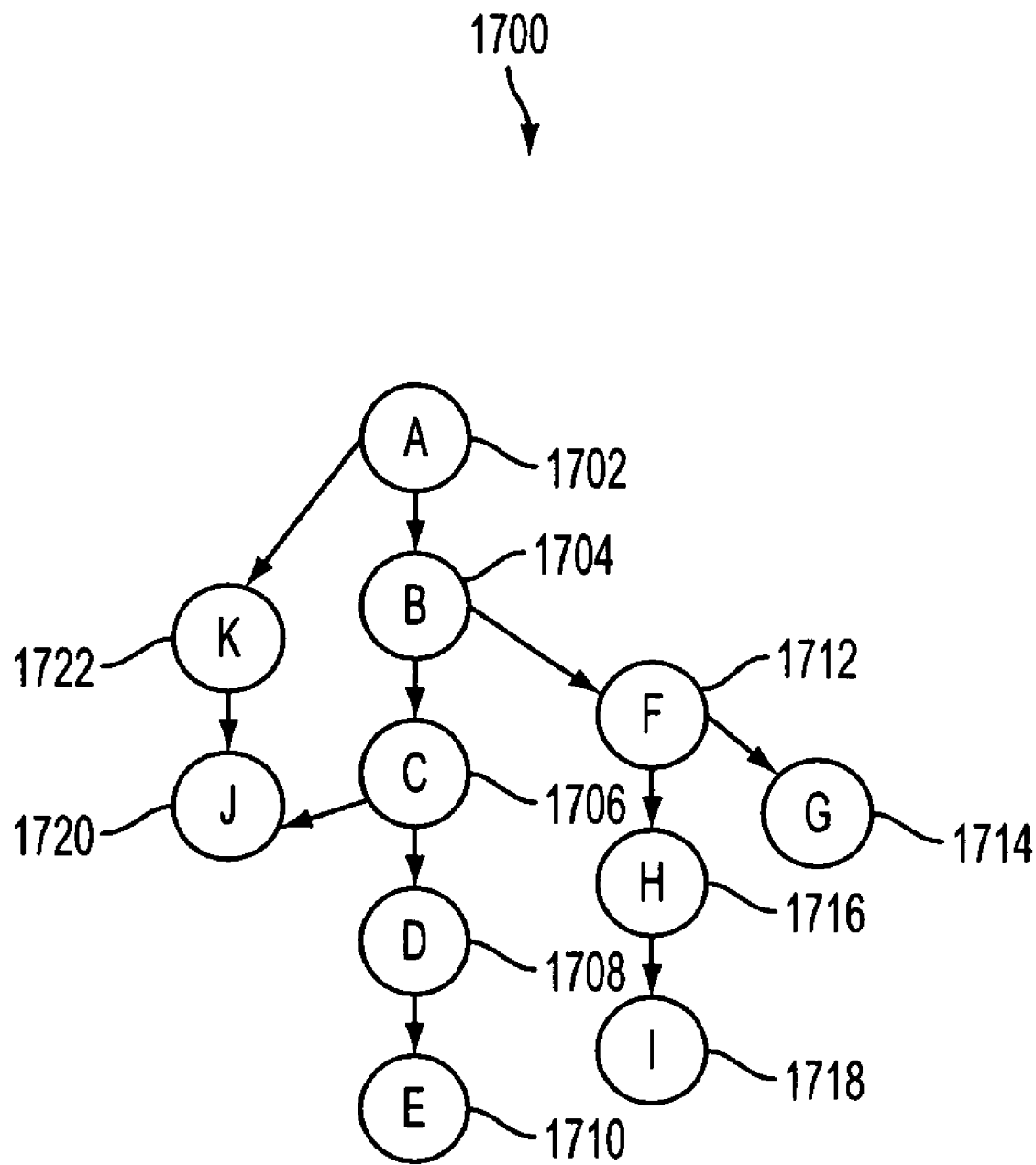
FIG. 17 is a diagram of a directed graph representing a set of order constraints.

Beginning with the order constraint type, FIG. 17 is a diagram of a directed graph 1700 representing a set of order constraints. More specifically, the set of order constraints is referred to herein as C(O), and is defined on a number of fragments $F_1, F_2, \ldots F_n$, where $F_i \subseteq F$ for $i = 1, 2, \ldots n$. Further, $F^{Order} = \{F_1, F_2, \ldots F_n\}$. Each set of order constraints C(O) may be associated with a directed graph such as the directed graph 1700, referred to generically as OG.

An example of a set of order constraints might be: $C(O) = \{O(\{A, B, C\}), O(\{A, K, J\}), O(\{A, C, J\}), O(\{A, B, F, G\}), O(\{F, H, I\}), O(\{C, D, E\}), \text{ and } O(\{B, F, H\})\}$. These seven order constraints within the set C(O) may be represented as the directed graph OG 1700, which may be used in generating a minimal specification for the set of order constraints C(O), as described above with respect to FIG. 15 (1502).

By way of definition, a graph is considered to be a set of items connected by edges, where each item is called a vertex or node, and an edge is a connection between two vertices. In a directed graph, an edge goes from one vertex, the source, to another, the target, and thus makes a connection in only one direction. Thus, the set of order constraints C(O) may be represented by representing fragments as nodes and specifying edges therebetween.

For example, in the directed graph OG 1700, a vertex or node A 1702 is connected to a node B 1704 which is connected to a node C 1706, which is connected to a node D 1708, which is connected to a node E 1710. The node B 1704 also is connected to a node F 1712, which is connected to a node G 1714. The node F 1712 also is connected to a node H 1716, which is connected to a node I 1718. The node C also is connected to a node J 1720, while the node A 1702 also is connected to a node K 1722.

The OG 1700 can be seen to be a directed graph as defined above, since all nodes are connected by an edge going from one (source) node to another (target) node. Moreover, the OG 1700 can be seen to be acyclic, since no path (i.e., list of nodes, each having an edge from it to the next node) forms a cycle (i.e., no path starts and ends at the same node).

Based on the above definitions, a cycle in the OG 1700 represents a conflict within the set of ordering constraints C(O), since, for example, such a cycle may represent a closed loop of fragments that cannot validly be included within a pocket of flexibility. As described below, a directed acyclic graph (DAG) such as the OG 1700 represents a conflict free set of order constraints, and further, may be used to determine $C(O)^{min}$, which is defined as a minimal specification for C(O). That is, in $C(O)^{min}$, all transitivity has been captured and redundancies eliminated, resulting in a more concise specification for the same set of order constraints.

Figure 18:
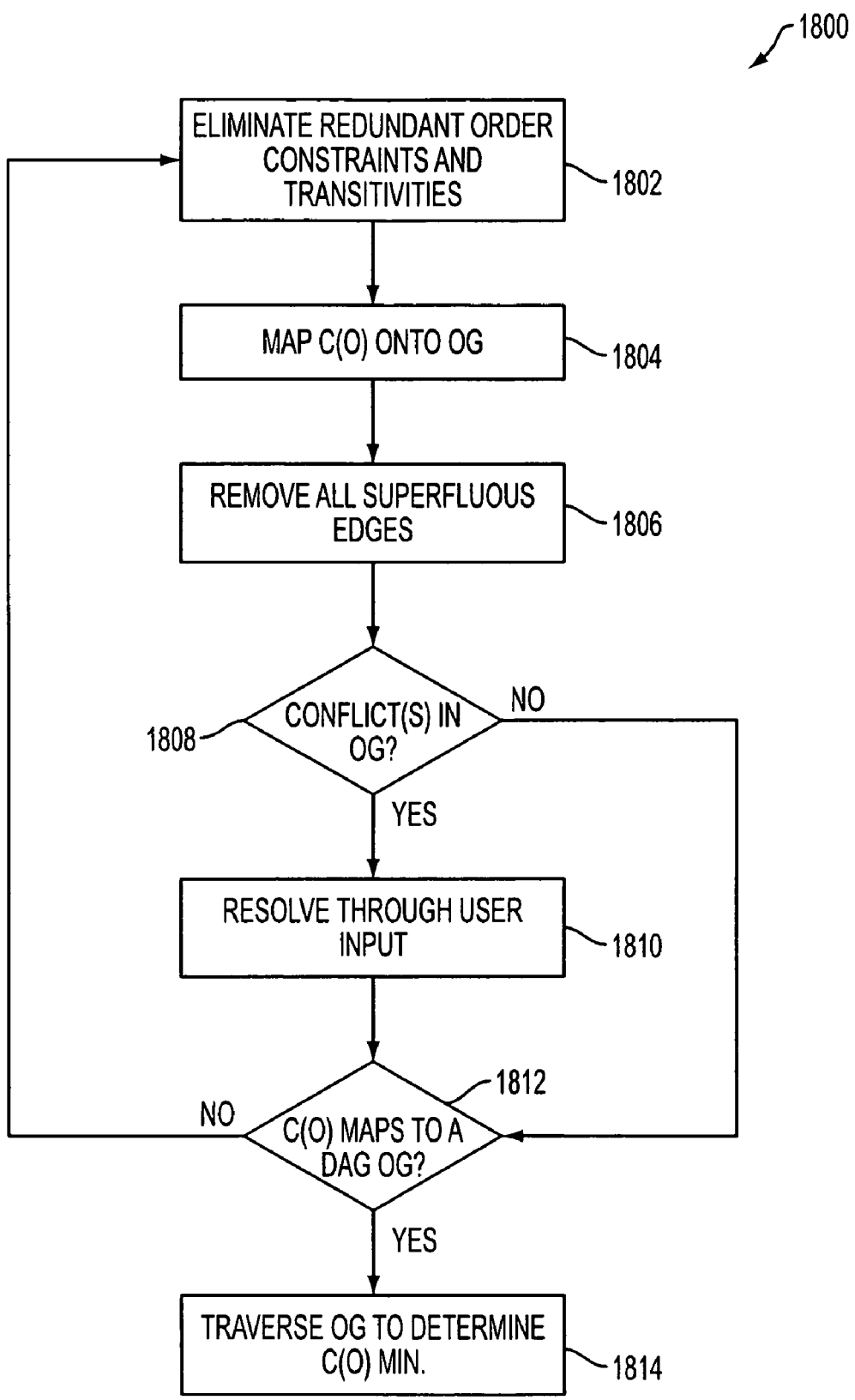
FIG. 18 is a flowchart illustrating a process used in determining a minimal specification for a set of order constraints.

FIG. 18 is a flowchart 1800 illustrating a process used in determining a minimal specification for a set of order constraints. In FIG. 18, as referred to above, a directed graph OG for a set of order constraints C(O) may be referred to as a "cover" (i.e., specification) for multiple sets of order constraints $C(O)_{1, 2}, \ldots$. As long as the OGs for each C(O) within the multiple sets are equal to one another, then the various sets of order constraints $C(O)_{1, 2}, \ldots$ may be considered to be equivalent to one another. Thus, the same OG may be generated by many different C(O)s, and such C(O)s are considered equivalent covers.

Thus, a minimum cover $C(O)^{min}$ is the set C(O) having the smallest number of elements (order constraints), so that a plurality of minimum covers may exist for a given set of order constraints C(O). The minimal cover $C(O)^{min}$ is used in the constraint validation procedure that is described above with respect to FIG. 15 (1514) and discussed in more detail below.

In finding a minimum cover for a given set of order constraints C(O), redundant order constraints are eliminated and transitivities are removed (1802); in particular, trivial or obvious redundant order constraints and transitivities are removed. For example, an order constraint that is subsumed within another order constraint(s), as described above with respect to FIG. 15, may be eliminated. This may be represented by stating that, for any $F_m$, $F_n \epsilon F^{Order}$, then if $F_n \subseteq F_m$, then $C(O)=C(O)-\{O(F_n)\}$.

Then, the set C(O) is mapped onto a directed graph OG, such as the OG 1700 (1804). As seen with the OG 1700, a set of nodes for OG is given by the union of all subsets contained in $F^{Order}$, that is $F_1 \cup F_2 \cup \ldots \cup F_n$. Thus, each node represents a fragment, and an edge between any two nodes $f_i$ and $f_j$ is defined if $f_i$ and $f_j$ are elements of the same subset $F_n$, that is, an order constraint $O(F_n)$ exists in C(O).

Superfluous edges between two nodes are then removed (1806), where such superfluous edges exist when there exists another path in the same direction, between the same two nodes. This eliminates any redundant specification within the order constraints that was not earlier removed.

If any conflicts exist within the directed graph OG (1808), i.e., if any cycles are observed with the directed graph OG, then these conflicts are resolved through user input (1810). For example, a user may be given the option to specify which conflicted order constraint(s) should be retained, and which should be eliminated or modified, based on underlying business logic.

Once conflicts (if any) are resolved (1810), then the resulting directed graph should (may) map to a directed acyclic graph (DAG). If this is not the case (1812), then the above-described procedures may be repeated to remove any redundancies or conflicts that may have earlier been missed.

The OG 1700 of FIG. 17 represents this stage during the process of determining a minimum cover for the set of order constraints represented by the OG 1700. That is, the OG 1700 represents a DAG having all redundancies removed.

In the OG 1700, or a similar DAG, a minimal cover $C(O)^{min}$ may be determined (1814) simply by traversing the OG 1700 to find all maximal non-branching paths of the OG 1700 or other DAG, such that no two paths have an edge in common. In FIG. 17, then, $C(O)^{min}$ would include $\{O(\{A, B, C, D, E\}),$ $O(\{A, K, J\}), O(\{C, J\}), O(\{B, F, G\}), O(\{F, H, I\})\}$.

Figure 19:
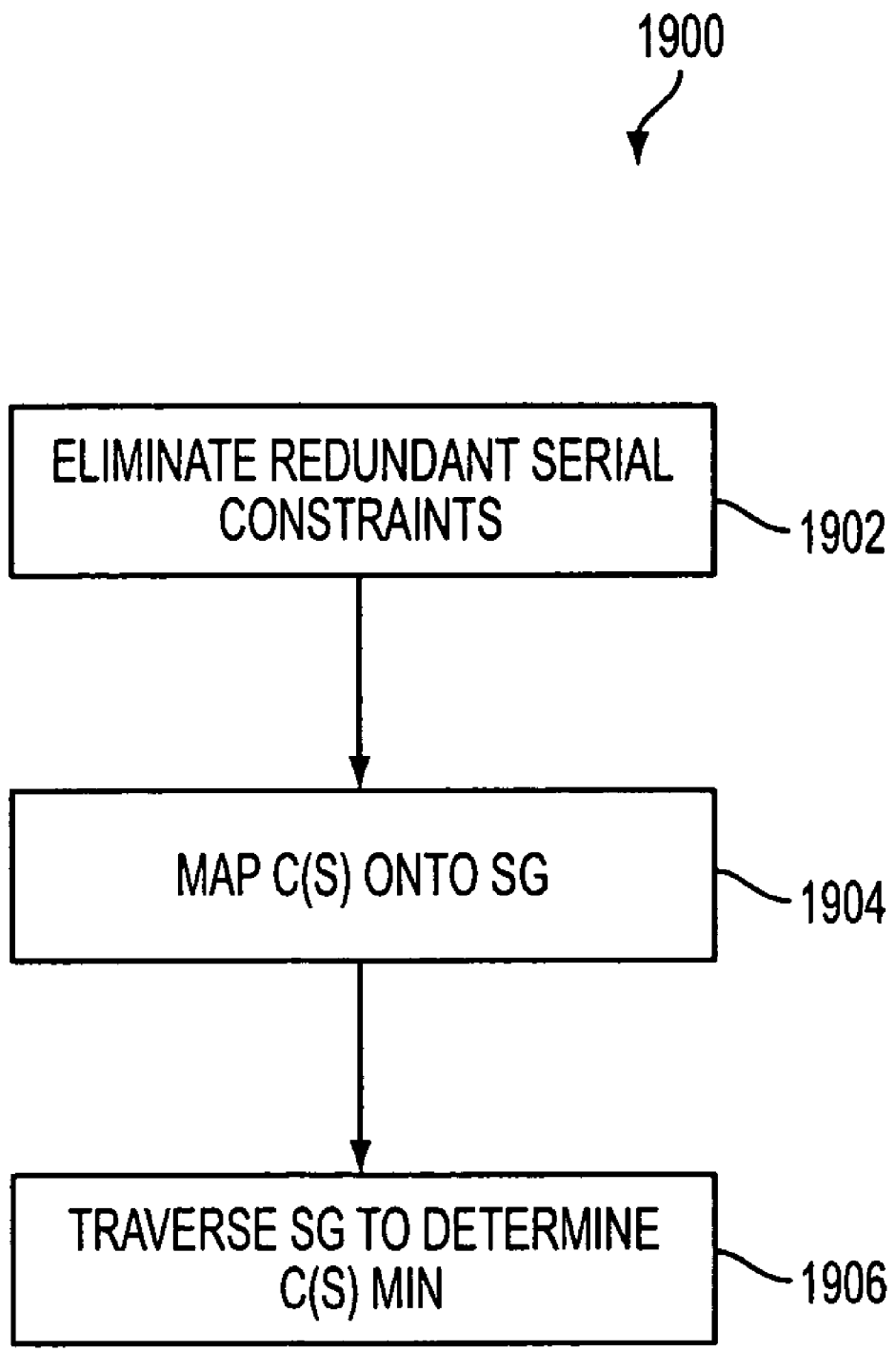
FIG. 19 is a flowchart illustrating a process used in determining a minimal specification for a set of serial constraints.

FIG. 19 is a flowchart 1900 illustrating a process used in determining a minimal specification for a set of serial constraints. As shown in Table 2 above, a serial constraint set will not typically have intra-constraint type conflicts in the sense that order constraint sets may. Also, a serial constraint set will not typically exhibit transitivity. Therefore, with reference to FIG. 15, finding a minimal specification for a set of serial constraints (1502) typically involves, for example, eliminating redundancies (1506), but may not require eliminating intra-constraint type conflicts (1508). Nonetheless, finding the minimal specification (1502) may still be useful in during, for example, later determinations of inter-constraint type conflicts (1514).

In FIG. 19, it is assumed that C(S) is a set of serial constraints defined on $F_1, F_2, \ldots F_n$, where $F_i \subseteq F$ for i=1, 2, ... n. Further, $F^{Serial}=\{F_1, F_2, \ldots F_n\}$. Then a fully connected graph SG is to be associated with the set of serial constraints C(S), as a cover for the set. It should be understood that the graph SG should not be a directed graph, since the serial constraint does not impose or require an ordering on the relevant fragments.

As seen above with respect to sets of order constraints, $C(S)_1$ and $C(S)_2$ are considered equivalent if and only if $SG_1 = SG_2$. Similar to the minimal cover defined above for order constraints, a minimum cover $C(S)^{min}$ for a given C(S) is defined as the smallest set $C(S)_i$ that is equivalent to C(S). Again, there may be several minimum covers, all with the same number of elements (serial constraints), but with different arguments.

As shown in FIG. 19, then, finding a minimum cover for a given C(S) may thus include first eliminating all redundant serial constraints (1902), that is, for any $F_m$, $F_n \epsilon F^{Serial}$, if $F_n \subseteq F_m$, then $C(S) C(S)-\{S(F_n)\}$. Then, C(S) may be mapped onto SG (1904). The set of nodes for SG is given by the union of all subsets contained in $F^{Serial}$, that is, $F_1 \cup F_2 \cup \ldots \cup F_n$, where each node represents a fragment. An edge between any two nodes $f_i$ and $f_j$ is defined if $f_i$ and $f_j$ are elements of the same subset $F_n$, that is, if a serial constraint $S(F_n)$ exists in C(S).

Finally, SG is traversed to determine $C(S)^{min}$ (1906). The determination of $C(S)^{min}$ from SG can be related to the problem of determining all (maximal) cliques within a graph, where a clique in a graph is a set of vertices, any two of which are adjacent.

Figure 20:
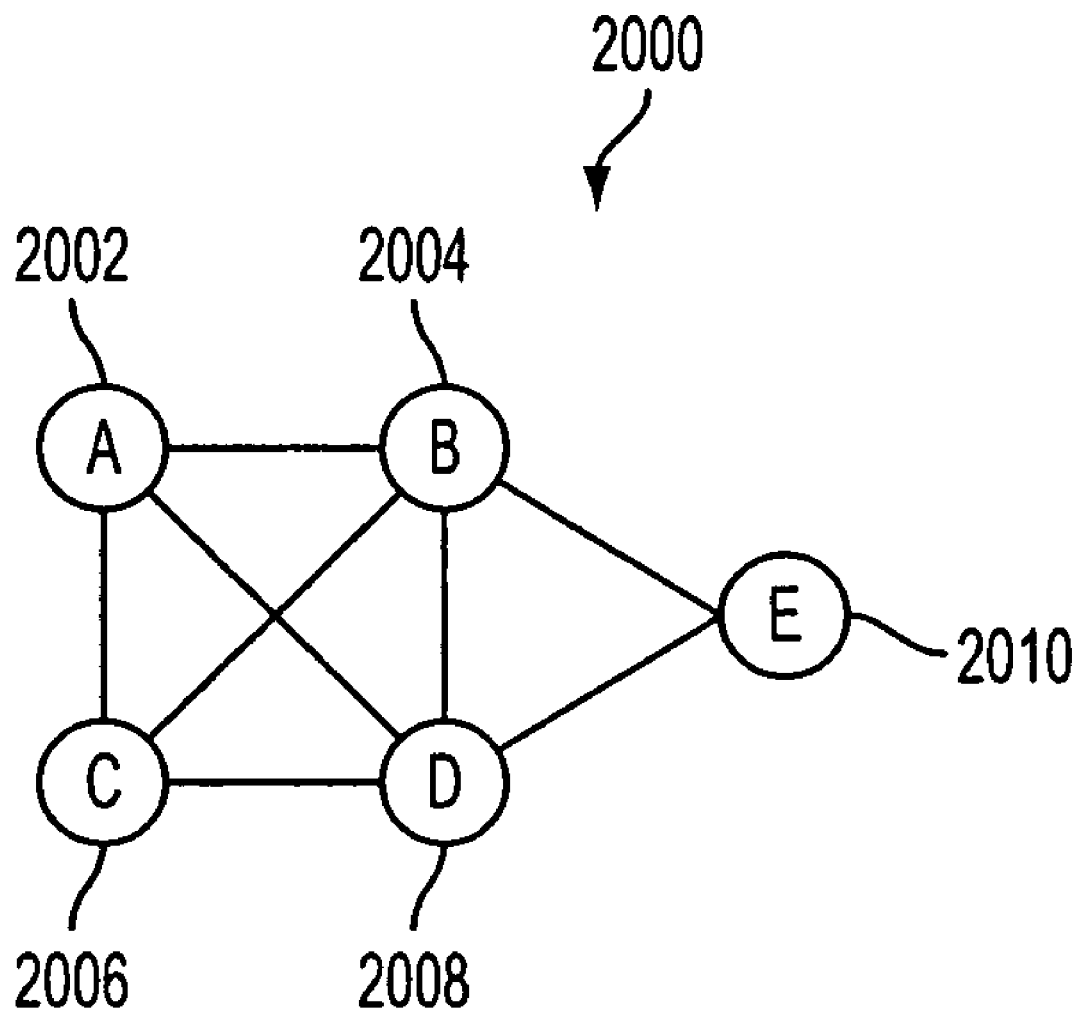
FIG. 20 is a diagram of a connected graph representing a set of serial constraints.

FIG. 20 is a diagram of a connected graph 2000 representing a set of serial constraints, referred to as the graph SG 2000. More specifically, the SG 2000 is defined with respect to a node A 2002, a node B 2004, a node C 2006, a node D 2008, and a node E 2010. The various nodes are subject to a set of serial constraints $C(S)=\{S(\{A, B, D\}), S(\{B, D, C\}), S(\{A, C\}), S(\{D, C\}), S(\{B, D, E\})\}$. The SG 2000 represents a mapping of these constraints onto a connected graph (1904), subsequent to a removal of any redundancies from the constraint set (1902).

$C(S)^{min}$ may thus be extracted from the SG 2000 by finding all maximal cliques within the graph 2000. Thus, $C(S)^{min}$ comprises $\{S(\{A, B, C, D\})$ and $S(\{B, D, E\})\}$. As already described with respect to FIG. 15, $C(S)^{min}$ eliminates all redundancies found within the original specification, leading to a minimal specification (1502).

Finding a minimal specification for a set of fork constraints C(F) is very similar to the process just described for a set of serial constraints C(S). Specifically, a set of fork constraints C(F) may be defined on $F_1, F_2, \ldots F_n$ where $F_i \subseteq F$ for i=1, 2, ... n, where $F^{Fork}=\{F_1, F_2, \ldots F_n\}$. Then, a characterization of fork constraints can be made very similarly to serial constraints, except that the semantics of the two constraints are different, in that an edge in a fully connected graph FG representing C(F) represents an absence of a path between the corresponding fragments in any valid template, rather than a presence of such a path. Nonetheless, since fork and serial constraint sets have the same properties (i.e., no transitivity, no conflict, but potential redundancy), the minimal specification can be determined in a similar way.

Specifically, sets of fork constraints $C(F)_1$ and $C(F)_2$ are equivalent if and only if cover $FG_1$=cover $FG_2$. Similar to minimal cover for order and serial constraints, for a given C(F), a minimum cover $C(F)^{min}$ is defined as the smallest set $C(F)_i$ that is equivalent to C(F). Again, there may be several minimum covers, all with the same number of elements (fork constraints), but with different arguments.

An example procedure for finding a minimum cover $C(F)^{min}$ for a given C(F), is the same as for serial constraints, as it is described above with respect to FIG. 19. Specifically, redundant serial constraints are eliminated, that is, for any $F_m$, $F_n \epsilon F^{Serial}$, if $F_n \subseteq F_m$, then $C(F)=C(F)-\{F(F_n)\}$. Then, C(F) is mapped onto FG, and FG is traversed to determine $C(F)^{min}$.

Figure 21:
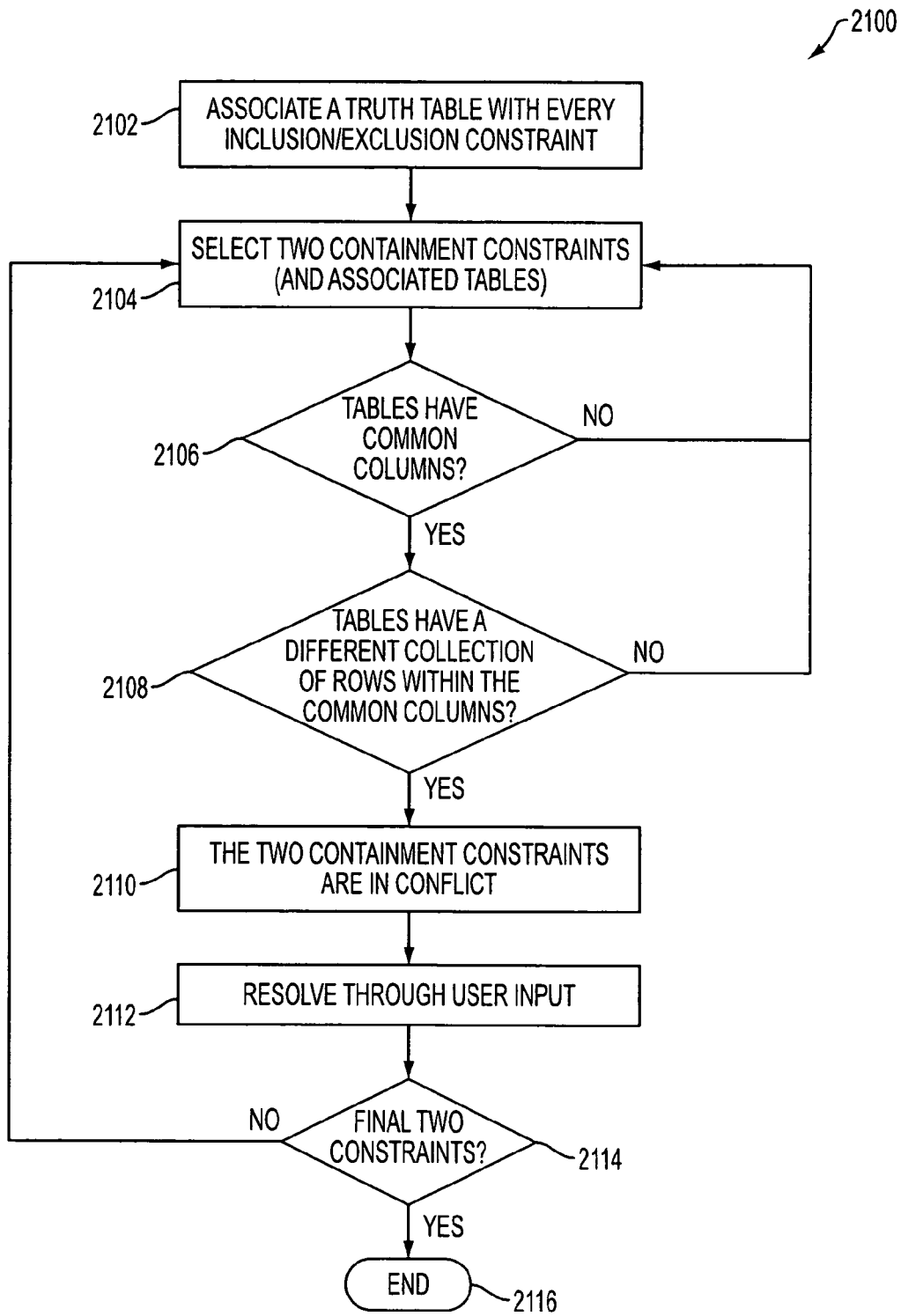
FIG. 21 is a flowchart illustrating a process used in determining a minimal specification for a set of containment constraints.
Figure 22A:
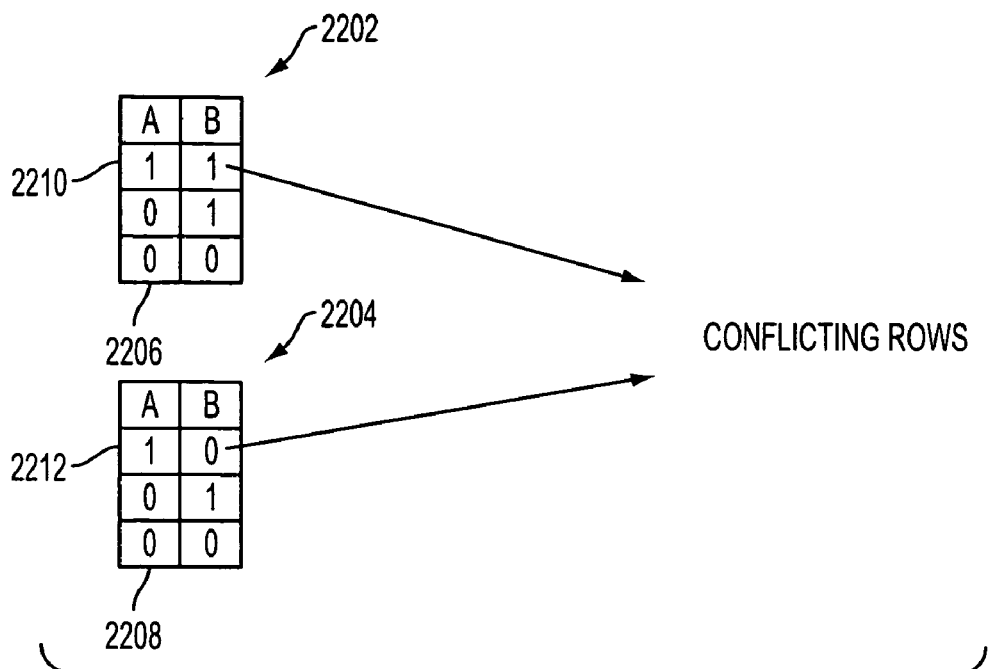
FIGS. 22A, 22B, and 23 are truth tables for various containment constraints.
Figure 22B:
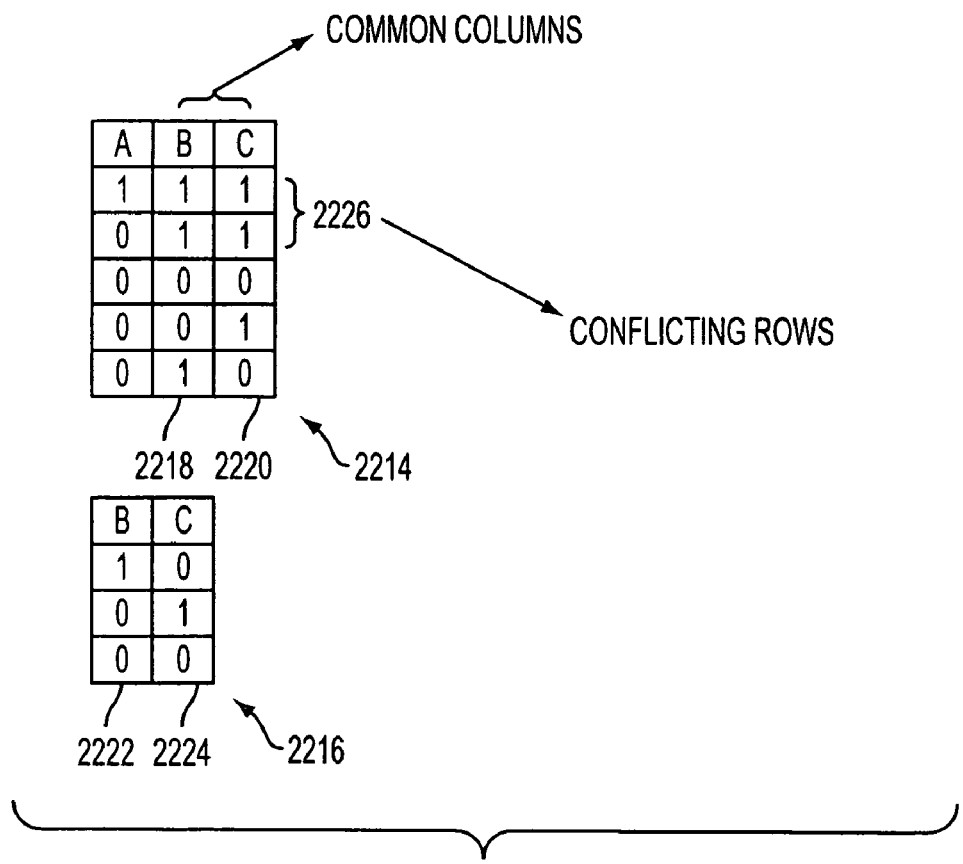
Figure 23:
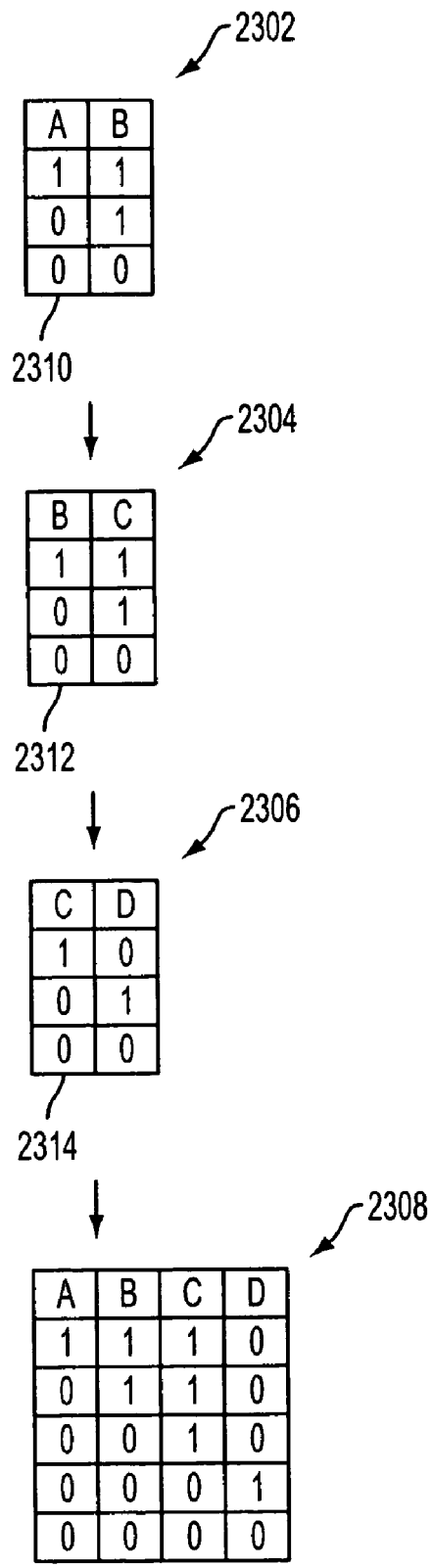
Figure 24A:
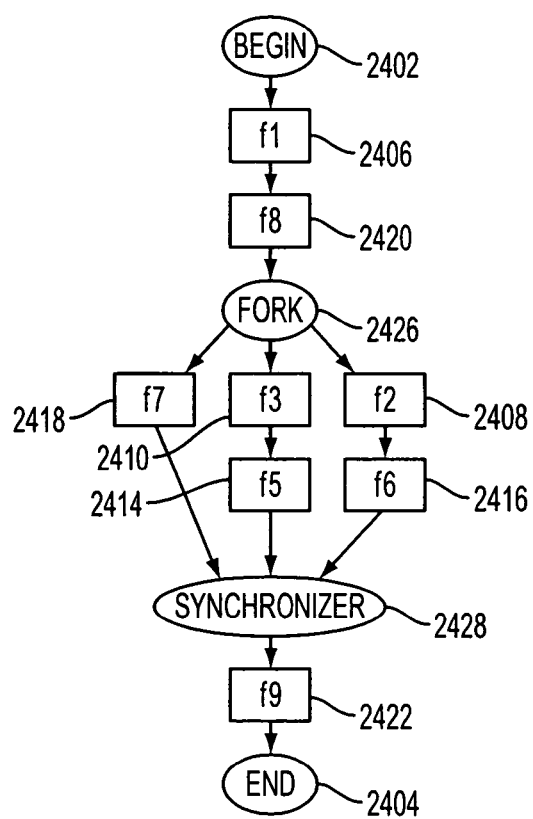
Figure 24B:
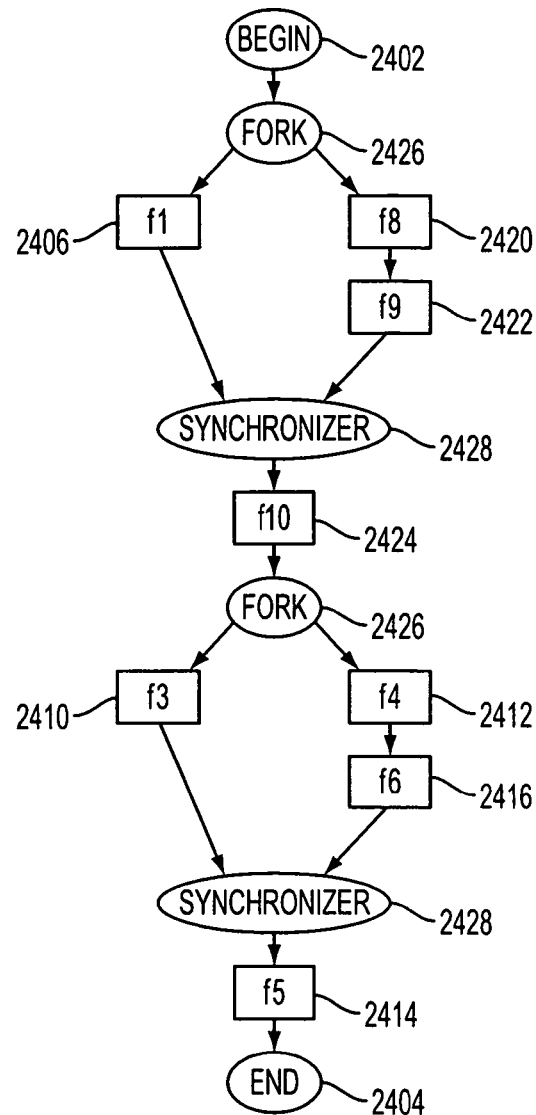
Figure 24C:
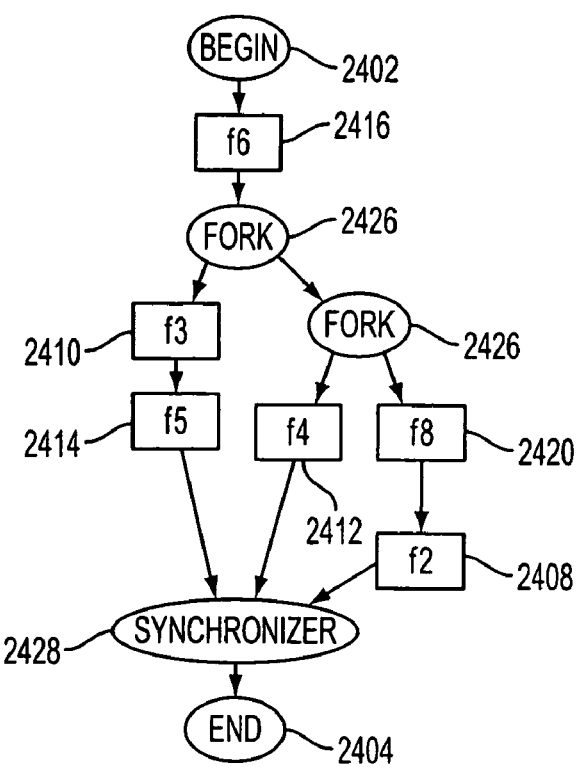
Figure 24D:
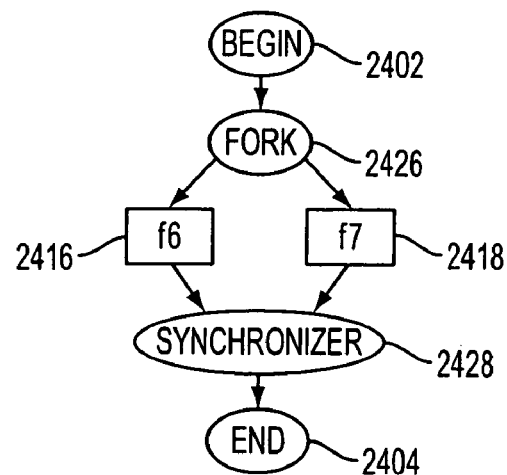
Figure 24E:
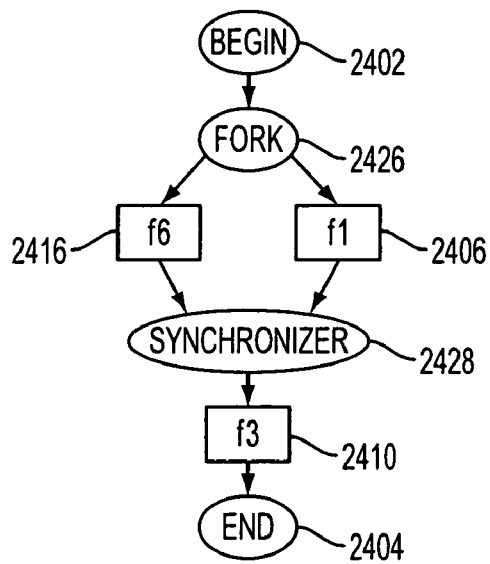
Figure 24F:
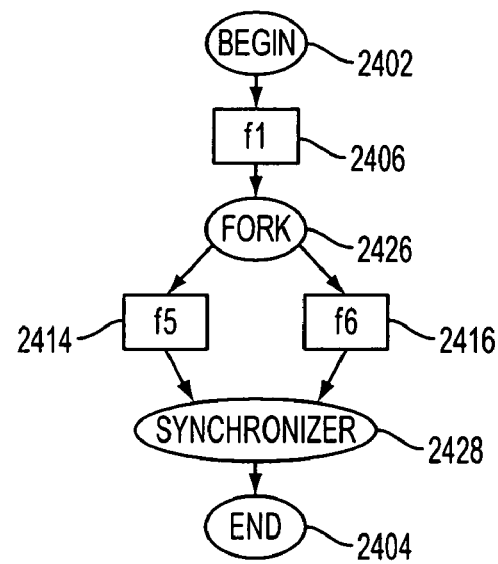
Figure 24G:
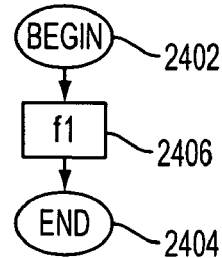
Figure 24H:
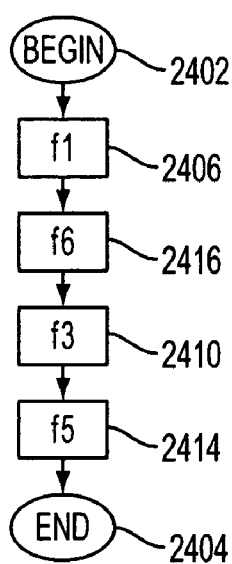
Figure 24I:
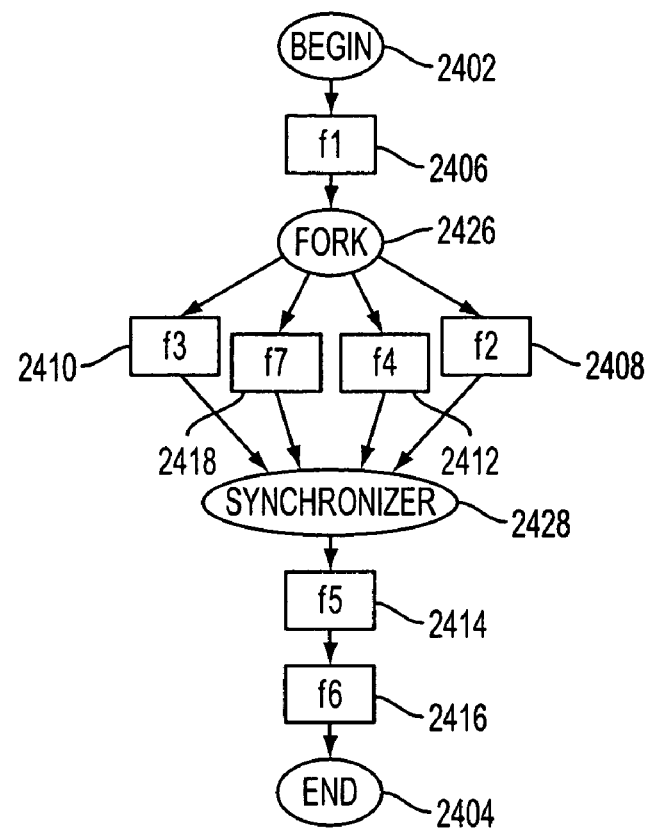

FIG. 21 is a flowchart 2100 illustrating a process used in determining a minimal specification for a set of containment constraints. The containment constraints may include, for example, inclusion and/or exclusion constraints. FIGS. 22A, 22B, and 23 are truth tables for various containment constraints.

As described above with respect to FIG. 15, a minimal specification may be determined (1502) for a particular type of constraint (e.g., serial, order, or fork), by, for example, eliminating redundancies (1506) and eliminating intra-constraint type conflicts (1508). Then, inter-constraint type conflicts may be resolved (1514).

In the following discussion of containment constraints, however, techniques are described which resolve conflicts both within constraint types (e.g., within inclusion or within exclusion constraint sets) and between constraint types (e.g., between inclusion and exclusion constraint sets). As a result, conflicts may be resolved and a minimal specification may be obtained for a set of containment constraints in a convenient and expeditious manner.

In FIG. 21, a truth table TT is formulated for each inclusion/exclusion constraint within sets of inclusion and exclusion constraints (2102). The truth table is a representation of the logical relation between constraint arguments. Although not explicitly shown in FIG. 21, truth table formulation may include eliminating any redundant constraints within a given constraint set, as described above.

For example, for an Inclusion constraint I({A}, {B}), a truth table 2202 of FIG. 22A illustrates that inclusion of constraint A necessitates inclusion of constraint B, whereas non-inclusion of constraint A implies that constraint B may or may not be included. Conversely, for an Exclusion constraint E({A}, {B}), a truth table 2204 of FIG. 22A illustrates that inclusion of constraint A necessitates non-inclusion of constraint B, whereas non-inclusion of constraint A implies that constraint B may or may not be included.

Next, two containment constraints (and their associated truth tables) are selected for conflict analysis (2104). Specifically, a conflict is indicated if the two tables have common columns (2106) and, if so, if the two tables have a different collection of rows within those common columns (2108). If so, then a conflict is determined to exist between the two constraints (2110), and may be resolved through user input (2112). If the two selected constraints represent a final set of constraint pairs (2114), then the process ends (2116). Otherwise, the next constraint pair is selected (2104).

For example, in the tables 2202 and 2204 of FIG. 22A, a column 2206 of table 2202 is common with a column 2208 of the table 2204. Moreover, a row 2210 of the table 2202 and a row 2212 of the table 2204 are conflicting, i.e., non-common. Therefore, a conflict exists between the two constraints I({A}, {B}) and E({A}, {B}).

In the example of FIG. 22B, a table 2214 represents a truth table for the inclusion constraint I({A}, {B, C}), while a table 2216 represents a truth table for the exclusion constraint E({B}, {C}). As can be seen, columns 2218 and 2220 of the table 2214 have elements in common with columns 2222 and 2224, respectively, of the table 2216. However, the rows 2226 of the table 2214 conflict with rows of the table 2216, since the rows 2226 do not exist in the table 2216. Therefore, a conflict exists between the constraints represented by the tables 2214 and 2216.

Although FIGS. 22A and 22B each represent an Inclusion and an Exclusion constraint, the process of the flowchart 2100 is equally applicable to two Inclusion constraints, and/or two Exclusion constraints. Thus, the process of the flowchart 2100 is capable of resolving intra-constraint type and inter-constraint type conflicts for sets of containment-type constraints.

Furthermore, in the process of FIG. 21, truth tables with common columns but no conflicting rows can be combined, such that a single truth table can be constructed for all constraints with common elements. For example, FIG. 23 illustrates a truth table 2302 for the Inclusion constraint I({A}, {B}), a truth table 2304 for the Inclusion constraint I({B}, {C}), and a truth table 2306 for the Exclusion constraint E({C}, {D}). The tables 2302, 2304, and 2306 have common columns 2310, 2312, and 2314, but no rows directly conflict with one another. As a result, the table 2308 may be formed that combines the tables 2302, 2304, and 2306, and that effectively provides a list of allowable combinations of fragments.

With respect to FIG. 15, the above discussion has provided examples of techniques for finding a minimal specification for a set(s) of constraints (1502). Specifically, algorithms for generating a minimal cover for each set of constraints of a given constraint type are discussed above, which include, as needed, elimination of transitivities/redundancies (1506) and resolution of intra-constraint type conflicts (1508).

Once a minimal specification has been generated, inter-constraint type conflicts may be resolved (1514). For example, types of inter-constraint type conflicts discussed above and shown in Table 2 include fork/order, fork/serial and inclusion/exclusion conflicts. As already explained, the generation of minimal specification may involve eliminating (inter-constraint type) conflicts between inclusion and exclusion constraints, or conflicts between inclusion and exclusion constraints may be resolved separately from intra-constraint type conflicts. The remaining conflicting constraints, e.g., fork/order and fork/serial, may be determined, for example, as discussed below.

Specifically, with respect to inter-conflict type constraints, a conflict exists between a fork and serial constraint if they have any 2 or more fragments in common. That is, given $S(F_m)$ and $F(F_n)$, there will be a conflict when $|F_m \cap F_n| > 1$. Similarly, with respect to fork and order constraints, a conflict exists between a fork and order constraint if they have any two or more fragments in common. That is, given $O(F_m)$ and $F(F_n)$, there will be a conflict when $|F_m \cap F_n| > 1$.

With respect to inclusion and exclusion constraints, an inter-constraint type conflict may exist inasmuch as a constraint set cannot have inclusion and exclusion constraints on the same fragment. That is, given $I(F_p, F_m)$, $E(F_q, F_n)$, there will be a conflict when $F_p = F_q$ and $F_m \cap F_n \neq \emptyset$.

Additionally, the constraint set of: $I(F_p, F_m)$, $E(F_q, F_n)$, and $F_q \cup F_n \subseteq F_m$ or $F_p \cup F_m \subseteq F_n$ provides a conflict. This can be seen by considering the constraint set of: I({A}, {B, C}) and E({B}, {C}), because any template containing A will not be verified against the above constraints. That is, a conflict results from that fact that any template containing A must contain B and C, while at the same time, any template containing B must not contain C.

After identifying such conflicts, actual resolution of the conflicts may be dependent on the user. For example, of two conflicting constraints O({A, B, C}) and F({A, B, D}) are given, the inter-constraint type conflict is identified since |{A, B, C}∩{A, B, D}| is not less than two. A resolution of this conflict may result in the fork constraint being changed to F({A, D}) and F({B, D}), while the order constraint remains the same. Similarly, the order constraint may be changed to O({A, C}) and O({B, C}), with the fork constraint remaining the same. Another possible conflict resolution may involve dropping the order constraint altogether. Many such possibilities may exist for resolving a given conflict, and, as described above, a given resolution will typically be selected based on the business logic or user needs/preferences in the given situation.

Although not discussed in detail above, it should be understood that, as a result of choices made during conflict resolution, the constraint set may be changed. These changes made may need to be validated by iterating through the above procedures, eventually generating a minimal and conflict free constraint set. Thus, $C^{min}$ leads to $C^{valid}$, where $C^{valid}$ represents the minimal and conflict-free set of constraints.

Such a minimal and conflict-free constraint set ensures that every fragment within a given pocket of flexibility may be included in at least one valid composition of the fragments (i.e., template). Nonetheless, this fact does not imply that every fragment may validly be included in any template, particularly given the objective that a relatively small set of fragments enables a relatively large number of processes. As a result, and as described above with respect to FIG. 15, a given template may require verification of the fact that selected fragments actually comply with the applicable constraint set(s) (1516).

In one implementation, a user may construct a template from a set of fragments within a pocket of flexibility, and then the constructed template may thereafter be validated. In another implementation, and as referred to above with respect to FIGS. 7 and 8, a user may progressively construct a template by selecting from among a set of fragments, where the available set of fragments is reduced after each selection to include only those remaining fragments that may validly be included within the template being formed. In the latter implementation, a simply user interface may be designed that permits the user to easily select from among available fragments. Moreover, when a given selection of the user results in only a single combination of remaining fragments remaining to be validly selected, then these remaining fragments may be automatically combined into a completed, valid template.

Figure 25A:
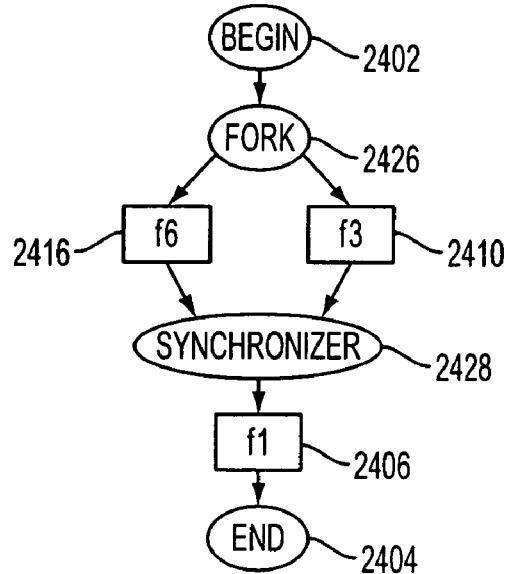
FIGS. 25A-25C are block diagrams of examples of invalid templates composed from the sets of fragments and constraints of FIGS. 24A-24K.
Figure 25B:
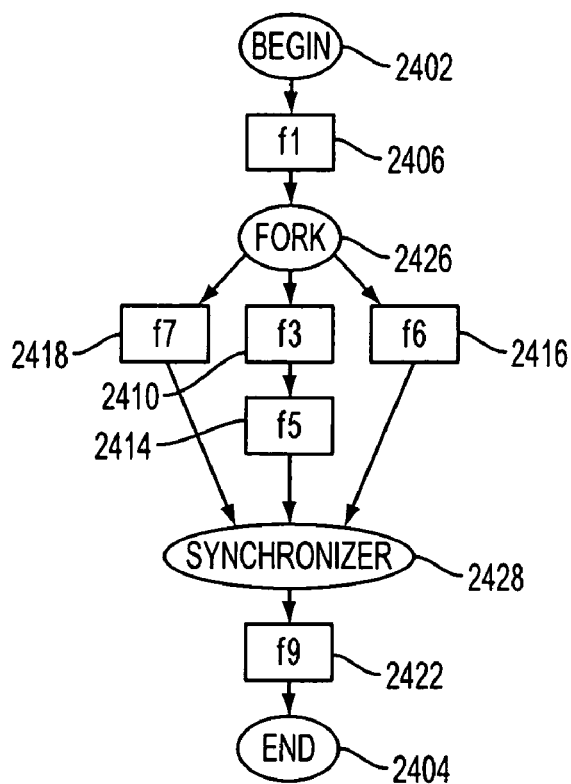
Figure 25C:
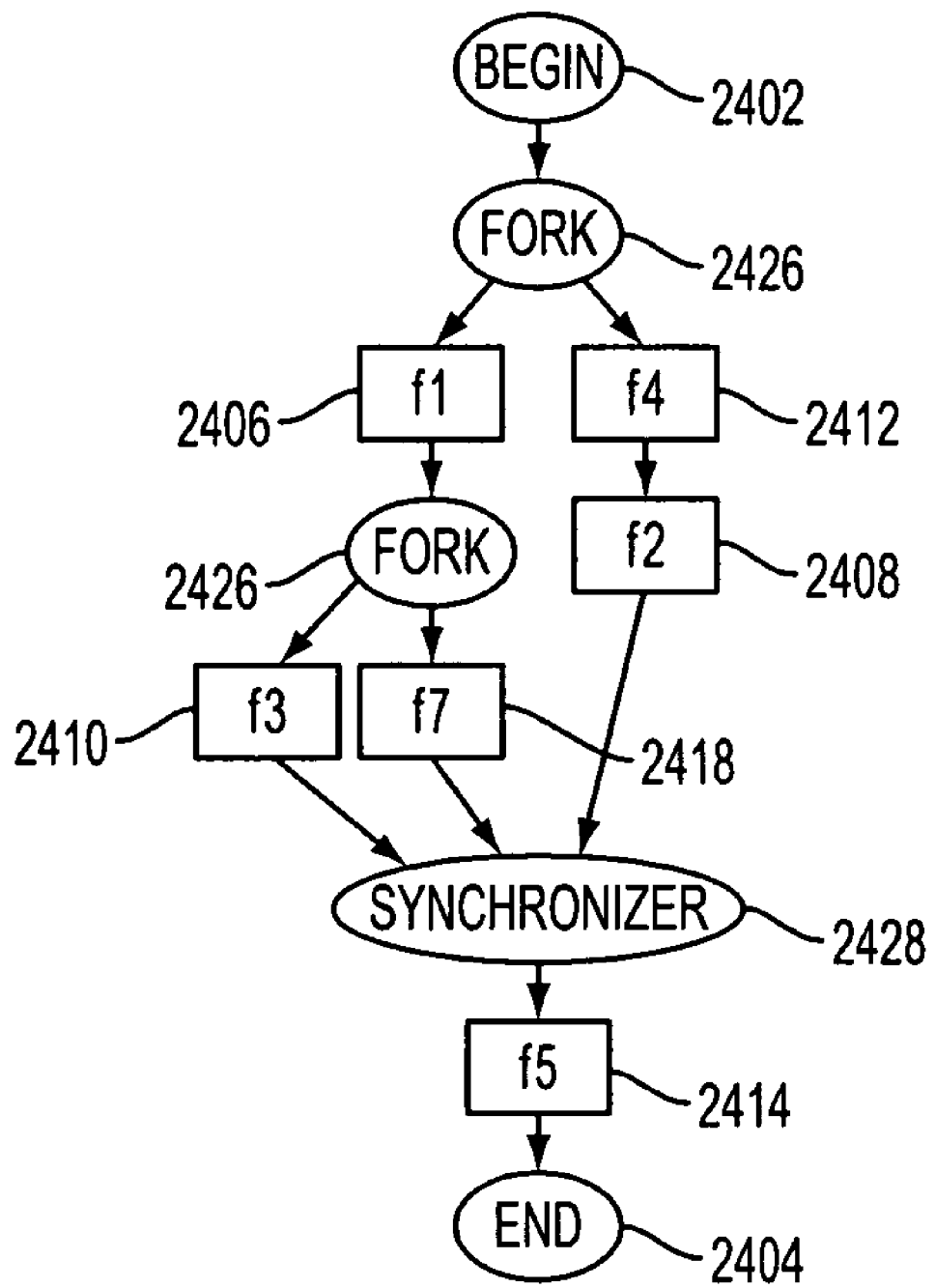

FIGS. 24A-24K are block diagrams of examples of valid templates composed from a given sets of fragments and constraints. Conversely, FIGS. 25A-25C are block diagrams of examples of invalid templates composed from the sets of fragments and constraints of FIGS. 24A-24K.

Specifically, FIGS. 24A-24K and 25A-25C assume a set of fragments defined as: F={f1, f2, f3, f4, f5, f6, f7, f8, f9, f10}. Additionally, FIGS. 24A-24K and 25A-25C assume a minimally-specified, conflict-free constraint set of process requirements defined as: O({f1, f3, f5}); F ({f2, f3, f4, f7}); and I({f7}, {f2, f3}).

In FIGS. 24A-24K and 25A-25C, a begin command 2402 and an end command 2404 bound the various templates. The fragments are referred to as a fragment f1 2406, a fragment f2 2408, a fragment f3 2410, a fragment f4 2412, a fragment f5 2414, a fragment f6 2416, a fragment f7 2418, a fragment f8 2420, a fragment f9 2422, and a fragment f10 2424. Finally, a fork task 2426 and a corresponding synchronizer task 2428 are available for enacting the fork constraint.

The templates of FIGS. 24A-24K and 25A-25C may be individually checked to verify that they do (or do not) comply with the various constraints. For example, it can be seen that the fragment f1 2406 is in violation of the relevant Order constraint in FIG. 25A, and that fragment f2 2408 is in violation of the Inclusion constraint in FIG. 25B. FIGS. 24A-24K and 25A-25C, of course, do not represent all possible valid/invalid templates that may be constructed with the given fragments and constraints, but rather represent just a few examples of the many possibilities that may exist.

In the cases of FIGS. 24A-24K and 25A-25C, verification of the applicable constraints may be determined by visual inspection. Once the number of constraints increases and/or the template built is large and complex, however, this visual verification may not be sufficient. Thus, algorithms for verifying these constraints may be utilized.

Plausible algorithms are presented below for each constraint type as corresponding code sections. These algorithms are based on the set of validated constraints $C^{valid}$, as determined by the constraint validation procedure given in the previous section. Generally speaking, the algorithms ensure that a given constraint type is met by a given set of fragments. For example, that an order limitation specified in an Order constraint is met, and similarly for Fork, Serial, Inclusion, and Exclusion constraint sets.

For the order constraint of a set of fragments $F_m$, i.e., $O(F_m)$, an algorithm to verify the order constraint may be used as demonstrated in Code Section 1:

Code Section 1

```
Verification of Order Constraint O (F_m)
GraphNodes: Set of Nodes in the workflow graph
OrderFrags: Set of fragments in F_m
Check: Set of Nodes
//Where the sets GraphNodes, OrderFrags, and Check have
elements of the //same type, i.e. a fragment will be a node in
the graph
//InDownPath (X, Y) returns true when a path from X to Y
can be found in the //workflow graph
//Count (S) returns the number of elements in the set S
Begin
Check :=   OrderFrags Intersect GraphNodes
If Check = {} then Return ("No Constraint Violation")
For i = 1 to Count (Check) –1
If InDownPath (Check[i], Check[i+1]) <> TRUE
Then
    Return-Error ("Order Constraint Violated")
End-If
End-For
    Return ("No Constraint Violation")
End
```

For the serial constraint of a set of fragments $F_m$, i.e., $S(F_m)$, an algorithm to verify the serial constraint may be used as demonstrated in Code Section 2:

Code Section 2

```
Verification of Serial Constraint S (F_m)
GraphNodes: Set of Nodes in the workflow graph
SerialFrags: Set of fragments in F_m
Check: Set of Nodes
//Where the sets GraphNodes, SerialFrags, and Check have
elements of the //same type, i.e. a fragment will be a node in
the graph
//InPath (X, Y) returns true when a path between X and Y
can be found in the //workflow graph. InPath (X, X) returns
true.
//Count (S) returns the number of elements in the set S
Begin
Check :=   SerialFrags Intersect GraphNodes
If Check = {} then Return ("No Constraint Violation")
For i = 1 to Count (Check)
    For j = 1 to Count (Check)
        If InPath(Check[i], Check[i]) <> TRUE
            Return-Error ("Serial Constraint
Violated")
        End-If
    End-For
End-For
Return ("No Constraint Violation")
End
```

For the fork constraint of a set of fragments $F_m$, i.e., $F(F_m)$, an algorithm to verify the fork constraint may be used as demonstrated in Code Section 3:

Code Section 3

```
Verification of Fork Constraint F (F_m)
GraphNodes : Set of Nodes in the workflow graph
ForkFrags: Set of fragments in F_m
Check: Set of Nodes
//Where the sets GraphNodes, ForkFrags, and Check have
elements of the //same type, i.e. a fragment will be a node in
the graph
//InPath (X, Y) returns true when a path between X and Y
can be found in the //workflow graph. InPath (X, X) returns
true.
//Count (S) returns the number of elements in the set S
Begin
Check :=   ForkFrags Intersect GraphNodes
If Check = {} then Return ("No Constraint Violation")
For i = 1 to Count (Check)
     For j = 1 to Count (Check)
        If InPath(Check[i], Check[j]) = TRUE
            Return-Error ("Fork Constraint Violated")
        End-If
     End-For
End-For
Return ("No Constraint Violation")
End
```

For the inclusion constraint of a set of fragments $F_p$, $F_m$, i.e., $I(F_p, F_m)$, an algorithm to verify the inclusion constraint may be used as demonstrated in Code Section 4:

Code Section 4

```
Verification of Inclusion Constraint I (F_p, F_m)
GraphNodes : Set of Nodes in the workflow graph
Present: Set of fragments in F_p
Include: Set of fragments in F_m
//Where the sets GraphNodes, Present, Include have
elements of the same //type, i.e. a fragment will be a node in
the graph
Begin
If Present Subset GraphNode
Then
   If Include Subset GraphNodes
   Then
       Return ("No Constraint Violation")
   Else
       Return-Error ("Inclusion Constraint Violated")
Else
   Return ("No Constraint Enforced")
End-If
End
```

For the exclusion constraint of a set of fragments $F_m$, i.e., $E(F_p, F_m)$, an algorithm to verify the exclusion constraint may be used as demonstrated in Code Section 5:

Code Section 5

```
Verification of Exclusion Constraint E (F_p, F_m)
GraphNodes: Set of Nodes in the workflow graph
Present: Set of fragments in F_p
Exclude: Set of fragments in F_m
//Where the sets GraphNodes, Present, Exclude have
elements of the same //type, i.e. a fragment will be a node in
the graph
Begin
If Present Subset GraphNode
Then
   If Exclude Intersect GraphNodes = {}
   Then
       Return ("No Constraint Violation")
```

Code Section 5 -continued

```
   Else
       Return-Error ("Exclusion Constraint Violated")
   Else
       Return ("No Constraint Enforced")
End-If
End
```

Once a template has been verified, the concretized fragments from within the pocket of flexibility may be released for use. The template may be used once, or may be saved for future use. In this way, users may have access to a large number of templates, while still being assured of the validity of all of the templates.

As described above, a flexible workflow may be provided by designing a process model that includes one or more pockets of flexibility. The process model also may include various pre-defined tasks having pre-defined relations therebetween (i.e., a core of the process model), in addition to the pocket(s) of flexibility. The pocket of flexibility may include workflow fragments that may be joined together into multiple instances of sub-workflows or (instance) templates, subject to various pre-defined constraints. The pocket of flexibility also may include a set of pre-defined tasks having pre-defined relations therebetween (i.e., a core template of the pocket of flexibility).

In implementing the process model, a user may encounter a pocket of flexibility, and may select from, for example, the various fragments, so as to construct an instance template that is consistent with the user's current needs. The fragments may be incrementally presented to the user on a user interface, perhaps based on (previous) user selections, such that only those fragments determined to be combinable in a valid way may be selected by the user.

In this way, a user who may have little or no experience with, for example, workflow languages or terminology, may easily be able to construct a needed instance template, and be confident that the template is valid for distribution and implementation by workflow performers. As a result, difficulties in dealing with change in workflow systems, which has been a factor in limiting deployment of workflow technology in some settings, may be mitigated. Moreover, this mitigation may be achieved without compromising the simplicity and genericity of a workflow specification language.

A number of implementations have been described. Nevertheless, it will be understood that various modifications may be made. Accordingly, other implementations are within the scope of the following claims.

What is claimed is:

1. A system for flexible workflow management, comprising:
    an apparatus including a storage medium having code segments stored thereon for execution of a workflow;
    a process modeling tool operable to create a workflow process model, the process model including a configurable task set that includes a plurality of tasks and a plurality of constraints that define relationships between the plurality of tasks, each constraint of the plurality of constraints corresponding to a constraint type of a plurality of constraint types, wherein the plurality of constraint types includes at least one structural constraint type and at least one containment constraint type;

a constraints validation engine operable to:
- simplify a specification of the plurality of constraints for each said constraint by resolving intra-constraint conflicts for each said constraint type to provide a minimal specification for each said constraint of the constraint type, wherein for each said constraint type, said constraints validation engine is operable to resolve said intra-constraint conflicts by (1) examining the plurality of constraints for transitivities and redundancies, (2) where possible, capturing any transitivities and removing any redundancies detected, and (3) employing a minimum cover algorithm when the constraint type is structural and a truth table algorithm when the constraint type is containment;
- resolve inter-constraint conflicts between each of the plurality of constraint types, taking into account any redundancies and/or transitivities detected between the plurality of constraint types; and
- validate the plurality of tasks and the plurality of constraints such that each of the plurality of tasks are includable in at least one task subset without violating any of the plurality of constraints in each of the minimal specifications of the plurality of constraints; and a workflow engine operable to create an open instance by copying the process model, and further operable to activate the configurable task set during execution of the open instance, and to thereby compile and execute an instance template including a selected task subset of the plurality of tasks.

2. The system of claim 1 wherein the constraints validation engine is further operable to validate the instance template for conformance with the plurality of constraints.

3. The system of claim 1 wherein the workflow engine is operable to activate the configurable task set by outputting the plurality of tasks for display to a user, and is further operable to accept the selected task subset from the user.

4. The system of claim 3 wherein the workflow engine is operable to accept the selected task subset from the user by outputting a revised task set for display to the user after accepting a selected task by the user.

5. The system of claim 1 wherein the plurality of constraints include a structural constraint that imposes a restriction on how tasks are included within the instance template.

6. The system of claim 1 wherein the plurality of constraints include a containment constraint that specifies conditions under which tasks are included within the instance template.

7. The system of claim 1 wherein the process model includes a pre-configured workflow portion having pre-defined tasks and task relationships, in addition to the configurable task set.

8. The system of claim 1 further comprising a worklist manager operable to communicate with the workflow engine and thereby disseminate task information related to the instance template to workitem performers.

9. The system of claim 1 wherein the plurality of constraints include at least one of an inclusion constraint and an exclusion constraint, the inclusion constraint identifying a dependency between task subsets such that the inclusion of a particular task subset within the workflow requires the inclusion of another particular task subset within the workflow, the exclusion constraint identifying a dependency between task subsets such that the inclusion of a particular task subset within the a workflow requires the exclusion of another particular task subset within the workflow.

10. The system of claim 1 wherein the plurality of constraints include at least one of a minimum constraint and a maximum constraint, the minimum constraint imposing a minimum number of task subsets that must be included in a workflow, the maximum constraint imposing a maximum number of task subsets that can be included in the workflow.

11. A method of flexible workflow management, comprising:
- storing a configurable task set in a storage medium, the configurable task set including a plurality of tasks and a plurality of constraints that define relationships between the plurality of tasks, each constraint of the plurality of constraints corresponding to a constraint type of a plurality of constraint types, wherein the plurality of constraint types includes at least one structural constraint type and at least one containment constraint type;
- creating a workflow process model using a process modeling tool, the process model including the configurable task set;
- simplifying a specification of the plurality of constraints for each constraint, using a constraints validation engine, by resolving intra-constraint conflicts for each said constraint type to provide a minimal specification for each said constraint of the constraint type, wherein for each said constraint type, said resolving is performed by (1) examining the plurality of constraints for transitivities and redundancies, (2) where possible, capturing any transitivities and removing any redundancies detected, and (3) employing a minimum cover algorithm when the constraint type is structural and a truth table algorithm when the constraint type is containment;
- resolving inter-constraint conflicts between each of the plurality of constraint types, taking into account any redundancies and/or transitivities detected between the plurality of constraint types;
- validating the plurality of tasks and the plurality of constraints such that each of the plurality of tasks are includable in at least one task subset without violating any of the constraints in each of the minimal specifications of the constraints;
- creating an open instance by copying the process model using a workflow engine; and
- activating the configurable task set during execution of the open instance to thereby compile and execute an instance template including a selected task subset of the plurality of tasks.

12. The method of claim 11 further comprising validating the instance template for conformance with the plurality of constraints.

13. The method of claim 11 further comprising:
- activating the configurable task set by outputting the plurality of tasks for display to a user; and
- accepting the selected task subset from the user.

14. The method of claim 13 further comprising accepting the selected task subset from the user by outputting a revised task set for display to the user after accepting a selected task by the user.

15. The method of claim 11 wherein the plurality of constraints include a structural constraint that imposes a restriction on how tasks are included within the instance template.

16. The method of claim 11 wherein the plurality of constraints include a containment constraint that specifies conditions under which tasks are included within the instance template.

17. The method of claim 11 further comprising providing a pre-configured workflow portion having pre-defined tasks and task relationships, in addition to the configurable task set.

18. The method of claim 11 further comprising disseminating task information related to the instance template to workitem performers.

19. The method of claim 11 wherein the plurality of constraints include at least one of an inclusion constraint and an exclusion constraint, the inclusion constraint identifying a dependency between task subsets such that the inclusion of a particular task subset within the workflow requires the inclusion of another particular task subset within the workflow, the exclusion constraint identifying a dependency between task subsets such that the inclusion of a particular task subset within the a workflow requires the exclusion of another particular task subset within the workflow.

20. The method of claim 11 wherein the plurality of constraints include at least one of a minimum constraint and a maximum constraint, the minimum constraint imposing a minimum number of task subsets that must be included in a workflow, the maximum constraint imposing a maximum number of task subsets that can be included in the workflow.

* * * * *